United States Patent [19]
Eberhardt et al.

[11] Patent Number: 5,505,449
[45] Date of Patent: Apr. 9, 1996

[54] VIDEO LOTTERY SYSTEM WITH IMPROVED SITE CONTROLLER AND VALIDATION UNIT

[75] Inventors: Lyle N. Eberhardt; Bryan L. Robertus, both of Bozeman, Mont.

[73] Assignee: Video Lottery Technologies, Inc., Bozeman, Mont.

[21] Appl. No.: 379,853

[22] Filed: Jan. 27, 1995

Related U.S. Application Data

[62] Division of Ser. No. 171,117, Dec. 21, 1993, Pat. No. 5,398,932.

[51] Int. Cl.$^6$ .................................................. A63F 9/22
[52] U.S. Cl. .................................................. 273/138 A
[58] Field of Search ........................ 273/138 R, 138 A, 273/139

[56] References Cited

U.S. PATENT DOCUMENTS

| | | | |
|---|---|---|---|
| 4,711,451 | 12/1987 | Pajak et al. | |
| 4,858,932 | 8/1989 | Keane | |
| 5,085,436 | 2/1992 | Bennett | |
| 5,242,163 | 9/1993 | Fulton | |
| 5,249,800 | 10/1993 | Hilgendorf et al. | 273/138 A |
| 5,265,874 | 11/1993 | Dickenson et al. | 273/138 A |
| 5,280,909 | 1/1994 | Tracy | 273/138 A |
| 5,282,620 | 2/1994 | Keesee | 273/138 A |
| 5,324,035 | 6/1994 | Morris et al. | 273/138 A |
| 5,326,104 | 7/1994 | Pease et al. | 273/138 A |
| 5,340,119 | 8/1994 | Goldfarb | 273/138 A X |
| 5,398,932 | 3/1995 | Eberhardt et al. | 273/138 A |

*Primary Examiner*—William H. Grieb
*Attorney, Agent, or Firm*—Kokjer, Kircher, Bowman & Johnson

[57] ABSTRACT

A video lottery system for playing electronic games on multiple video lottery terminals. The system includes a central computer at a central site and at least one gaming site remotely located from the central computer. The gaming site includes a plurality of video lottery terminals which play games and generate cash tickets representing an amount won during game play. The terminals are organized into groups, each of which is managed by a site controller connected thereto. The site controllers communicate with one another via a site management ring. A unique communications protocol used on the management ring allows multiple types of logical devices (also called ring devices) to communicate with one another along the ring. Each site controller authorizes terminals within a corresponding group of terminals to generate cash tickets and is capable of validating every cash ticket generated within the video lottery system. The site controllers emulate several logical devices including a cash ticket validation console, a terminal polling device and a ring-issuing device. The site controllers and terminals communicate via encrypted messages for security purposes. This encryption system uses multiple encryption and decryption keys at each terminal and site controller. The site controllers perform triple redundancy information storage to ensure the integrity of the ticketing information therein.

27 Claims, 13 Drawing Sheets

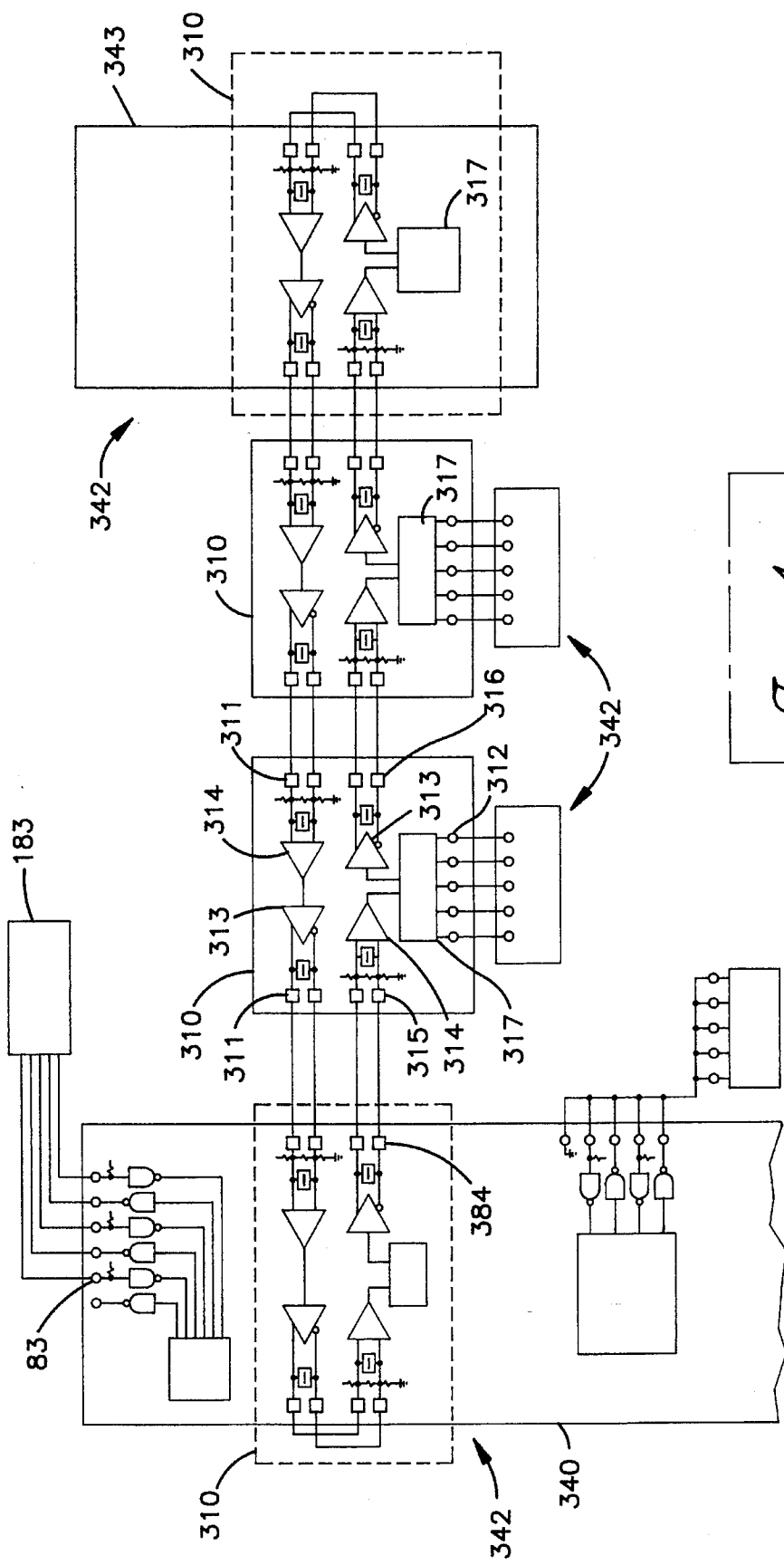

5,505,449

VIDEO LOTTERY SYSTEM WITH IMPROVED SITE CONTROLLER AND VALIDATION UNIT

This is a division of application Ser. No. 08/171,117, filed Dec. 21, 1993, now U.S. Pat. No. 5,398,932.

FIELD OF THE INVENTION

The present invention generally relates to the field of video lottery systems.

BACKGROUND OF THE INVENTION

Generally, within the video lottery field, systems have been provided in which electronic gaming machines are stationed at casinos, bars, restaurants, etc. (hereafter referred to as "points of sale" or "gaming sites") These gaming machines (hereafter referred to as "video lottery terminals" or "VLTs") allow a user to play one or more games such as keno, black jack, slot machines, draw poker, etc. Before playing, the user "places a bet," for instance, by physically inserting dollar bills into an automatic money collector within the video lottery terminal (VLT). The VLT identifies the inserted money as a $ 1.00, $ 5.00, $ 10.00, etc., and accordingly credits the player's account at that terminal.

When a player chooses to redeem the account, the VLT issues a printed ticket containing an authorization number uniquely identifying the ticket and the amount of the cash payout. The VLT creates each authorization number by simply incrementing a previous authorization number which corresponded to a preceding game. The player presents the winning ticket to a clerk or bartender who redeems it for the printed cash payout amount. However, these systems provide little assurance of the ticket's validity.

In the past, systems have been proposed in which multiple VLTs (possibly several hundred) are set up at a particular casino. A group of VLTs (approximately 10) are serially connected to a site controller SC, a video management terminal VMT or a clerk validation terminal CVT (hereafter referred to as "local control terminals"). The local control terminal stores information concerning each cash ticket printed at a VLT, including the authorization number, VLT identification number and cash payout amount. The local control terminal is also connected, via a modem and a conventional telephone network, to a central computer which controls operation of the overall lottery system.

Each time a VLT issues a ticket to a player, it sends the information contained upon the ticket to the local control terminal connected thereto for recordation. Upon request, the local control terminal displays this information to the clerk. When each cash ticket is presented, the clerk compares the authorization number on the ticket with the corresponding stored authorization number. If these numbers match, the presented ticket is deemed valid and the winnings are paid out by the clerk.

However, this conventional system has several drawbacks. Specifically, each local control terminal only maintains, and has access to, information concerning the VLTs connected thereto. Thus, a player must present each winning ticket to the clerk at, and only at, the local control terminal connected to the VLT that issued the ticket. This presentment limitation inconveniences ticket holders since a single casino may include more than one local control terminal. The player may become confused and attempt to present the ticket to the wrong clerk, or, similarly, a may have to wait for the proper local control terminal to be available.

Further, conventional systems do not provide adequate security since "hackers" may easily interject false information onto the communication line between the VLTs and the local control terminal. These hackers may simulate a VLT transmission and convey false ticket information to the local control terminal alleging that a VLT has printed a cash ticket. Conventional systems are susceptible to this type of fraud since these systems allow the VLT to inform the local control terminal of both the cash payout and the corresponding authorization number. Further, this type of fraud is facilitated by the fact that the VLTs use sequential authorization numbers that are easily anticipated.

An alternative system has been proposed in which the VLT requests the validation number from the local control terminal. However, in this alternative system, if the requested number is delayed or not successfully communicated to the VLT, then the VLT is allowed to generate its own authorization number and print a ticket. In this instance, the VLT subsequently sends this self-generated authorization number and the cash payout to the local control terminal. Thus, even in this alternative system a hacker can simulate a VLT and still generate valid tickets by always sending a self-generated authorization number to the local control terminal, ignoring the requesting process.

Another system has been proposed in which communications between the VLT and local control terminal have been encrypted for security purposes. The encrypted communications are decrypted with an encryption key stored in the VLT. During start-up, a universal encryption key is broadcast over the communication's lines and used, throughout operation, by every VLT. However, this encryption scheme is easily broken since any hacker may obtain the encryption key if they are "listening in" during this start up broadcast and if they know the communications protocol. Also, once the hacker learns the encryption key that key is valid for all subsequent communications for all VLTs. The encryption scheme remains simple since the protocol used for communications between the VLTs and local control terminal is unable to support a more complex encryption scheme. Therefore, the encryption technic used within this conventional system is easily broken.

SUMMARY OF THE INVENTION

Accordingly, it is an object of the present invention to overcome the above disadvantages of the prior art.

Specifically, it is an object of the present invention to provide a video lottery system which allows players to present a winning ticket at any site controller, even when that winning ticket is generated by a video lottery terminal not directly connected to that site controller.

It is another object of the present invention to provide a site controller which is able to obtain ticket validation information from any other site controller at the gaming site for validation purposes.

It is another object of the present invention to provide a site controller that maintains an increased number of video lottery terminals It is another object of the present invention to provide a site controller that performs triple redundancy information storage to provide data protection and error correction.

It is another object of the present invention to provide a system that requires one modem at a point of sale, while still allowing multiple VLTs to communicate with a central control site.

It is another object of the present invention to provide improved security for communications between the video lottery terminals and the site controller by securely encrypting communications.

It is another object of the invention provide an encryption scheme that provides a reliable method for changing encryption keys and a reliable method for ensuring that the proper key is used within the VLT.

It is another object of the present invention to provide a communications network and protocol within a point of sale which facilitates communication between multiple logical device types, such as local PC computers, printers, displays, and site controllers performing the tasks of a ,cash ticket validation console, ring master device and video lottery terminal polling console.

These and other objects are achieved by providing a video lottery system for tracking the play of electronic games on multiple video lottery terminals. The system includes a central computer at a central site and at least one gaming site remotely located from the central computer. The gaming site includes a plurality of video lottery terminals which play games and generate cash tickets representing an amount won during game play. The terminals are organized into groups, each of which is managed by a site controller connected thereto. The site controllers communicate with one another via a site management ring. A unique communications protocol used on the management ring allows multiple types of logical devices (also called ring devices) to communicate with one another along the ring. Site controllers authorize terminals within a corresponding group of terminals to generate cash tickets and are capable of validating every cash ticket generated within the video gaming site. The site controllers emulate several logical devices including a cash ticket validation console, a terminal polling device and a ring master device. The site controllers and terminals communicate via encrypted messages for security purposes. This encryption system uses multiple encryption and decryption keys at each terminal and site controller. The site controllers perform triple redundancy information storage to ensure the integrity of the ticketing information therein.

BRIEF DESCRIPTION OF THE DRAWINGS

The objects and features of the invention noted above are explained in more detail with reference to the drawings, in which like reference numerals denote like elements, and in which:

FIGS. 4a–4d are schematic views of a communications network according to the present invention;

DETAILED DESCRIPTION OF THE INVENTION

I. VIDEO LOTTERY SYSTEM

Figure 1:
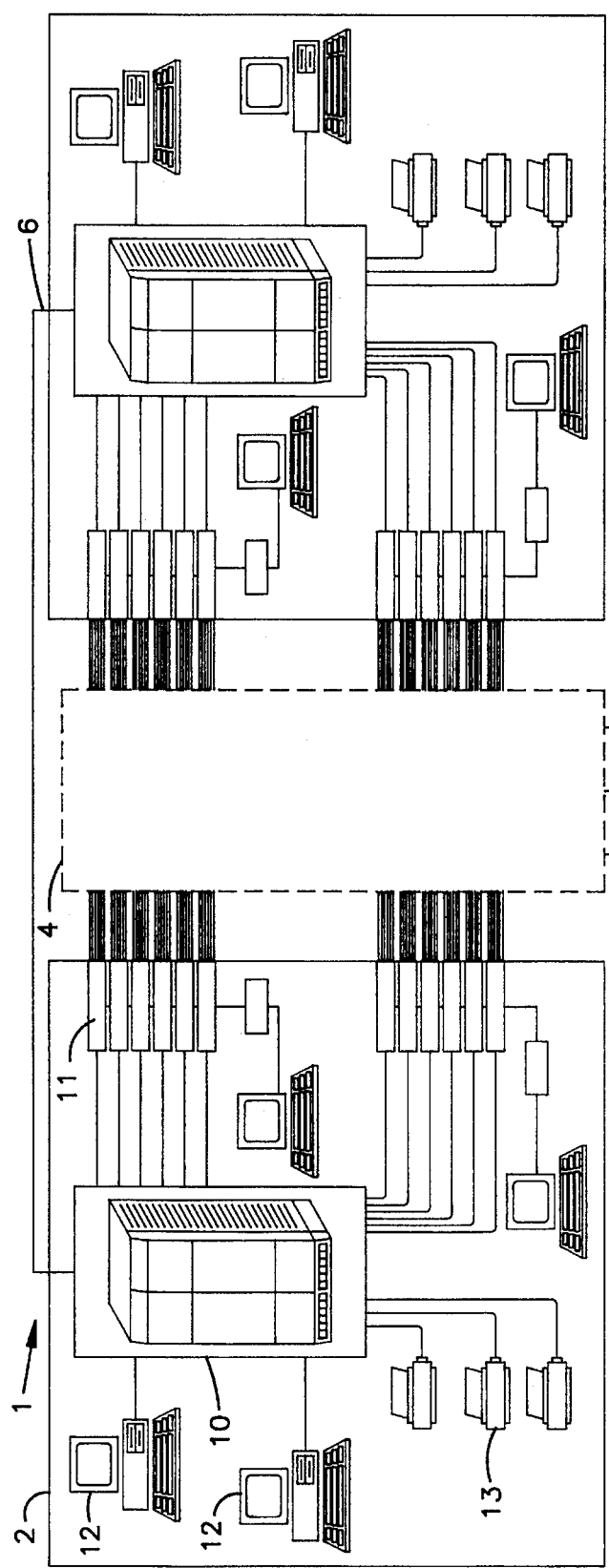
FIG. 1 is a block diagram of a video lottery system according to the present invention.
Figure 1:
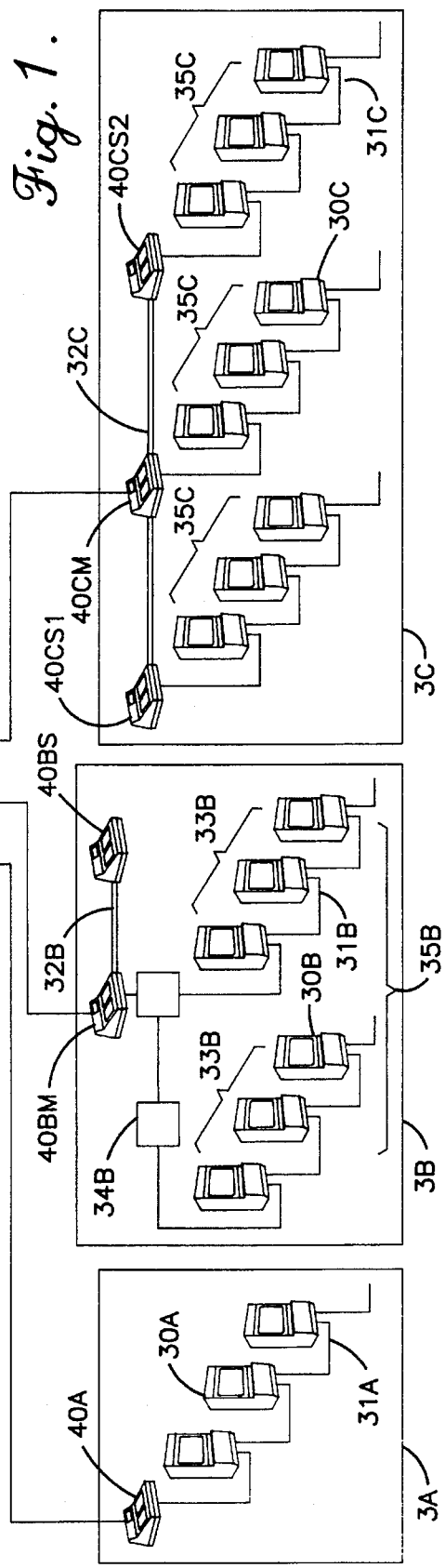

Referring to FIG. 1, the overall video lottery computer network is generally referred to by reference numeral 1. The video lottery network includes a primary central site 2 that is connected to gaming sites 3 (also points of sale) via a telephone network 4. The primary central site 2 includes a mainframe central site computer 10 that manages the overall operation of the video lottery system. The mainframe 10 is connected to multiple regional polling site (RPS) banks 11 which act as buffers for transferring data between the mainframe 10 and the telephone network 4. Management terminals 12 allow multiple operators to access the video lottery data stored in the mainframe 10. This data may include, but is not limited to, the value of proceeds taken in and paid out at each gaming site 3, the number of games played, the number of outstanding winning tickets, and the peak times of usage. Console printers 13 may also be connected to the mainframe 10 to provide hard copies of data stored in the mainframe 10.

Optionally, the video lottery network includes a backup central site 5, the architecture and operation of which is substantially identical to that of the primary central site 2. The backup central site 5 is only utilized when the status link 6 indicates that the primary central site 2 is inoperative.

The telephone network 4 merely represents any local or long distance telecommunications network as offered by known telephone carriers. This network 4 allows the primary central site 2 to communicate with each gaming site 3 via conventional telephone lines.

FIG. 1 illustrates three gaming sites 3, each of which utilizes a different configuration for the video lottery terminals (VLT) 30. However, the present lottery system may include millions of gaming sites. Also, as explained hereafter, each gaming site within the present invention may include hundreds of VLTs 30. Each gaming site 3 may include one or more site controllers 40 connected, via VLT communications buses 31, to the VLTs 30 in various configurations. If multiple site controllers (SC) 40 are used, they are connected to one another via a site management ring 33 (SMR). As explained below, the SMR 32 supports communication between logical devices of various types, including site controllers 40, local PC terminals, and printers (not shown). Each logical device communicates via uniquely formatted command sets.

II. SITE CONTROLLER OVERVIEW

Figure 2:
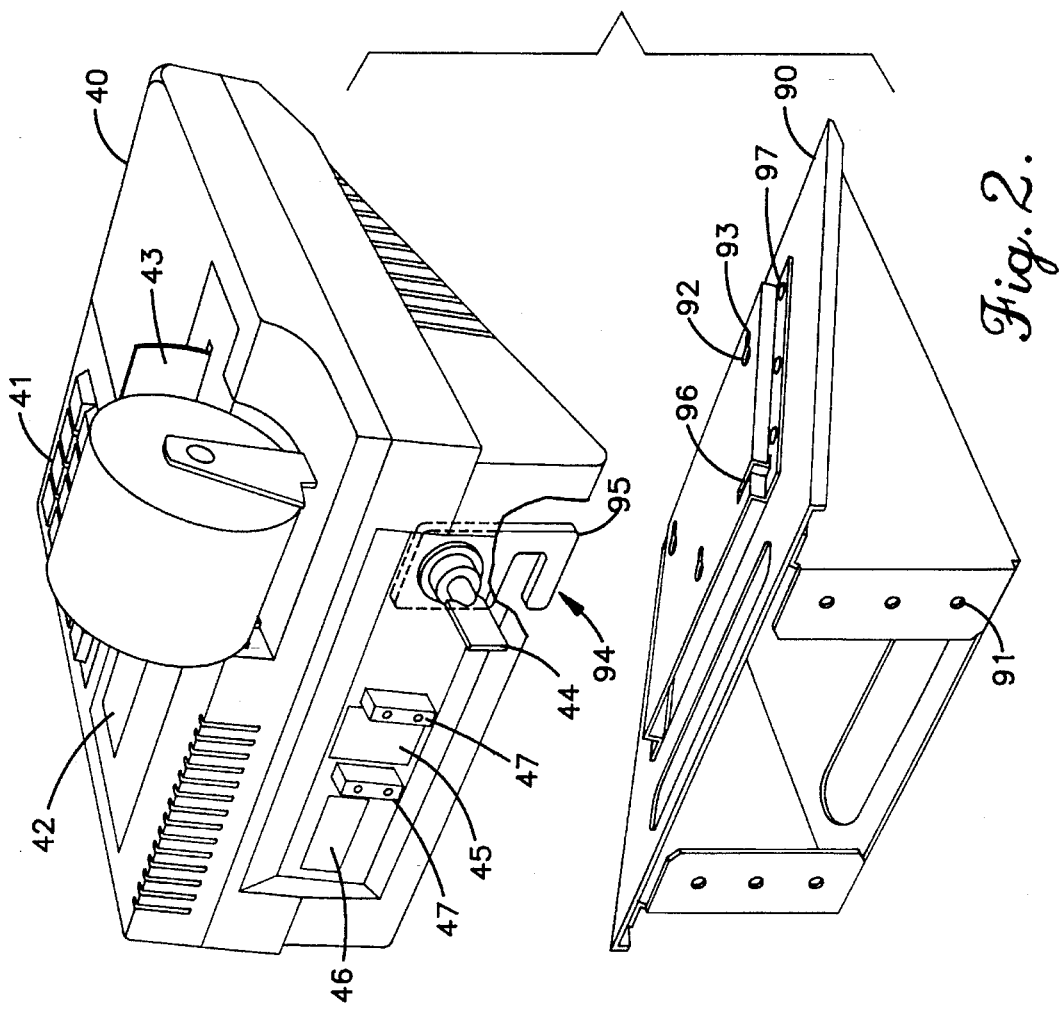
FIG. 2 is a perspective view of a site controller and security plate according to the present invention.

FIG. 2 illustrates a perspective view of the outer appearance of a site controller (SC) 40, which includes a keypad 41, a LCD display 42, a printing machine tape 43, a security key 44, a power cord connector 45 and communications connectors 46. The keypad 41 includes numerals 0–9, two arrow keys, function keys (F1–F4), and SIGN ON/OFF, VALIDATION, DELETE and ENTER keys. As explained below, the keypad 41 allows a clerk to validate cash tickets and to record cash payouts. The display 42 displays recorded information to the clerk for each cash payout request and prompts the clerk for additional information. The machine tape 43 provides a permanent record of each payout. An external power source provides power to the SC via the power cord connector 45. Blocks 47 fasten to the power cable and relieve any strain on the cable and to prevent accedental disconnection. The SC communicates with the video lottery terminals 30, central site 2, and other devices via communications connectors 46.

A. Site Controller Architecture

Figure 3:
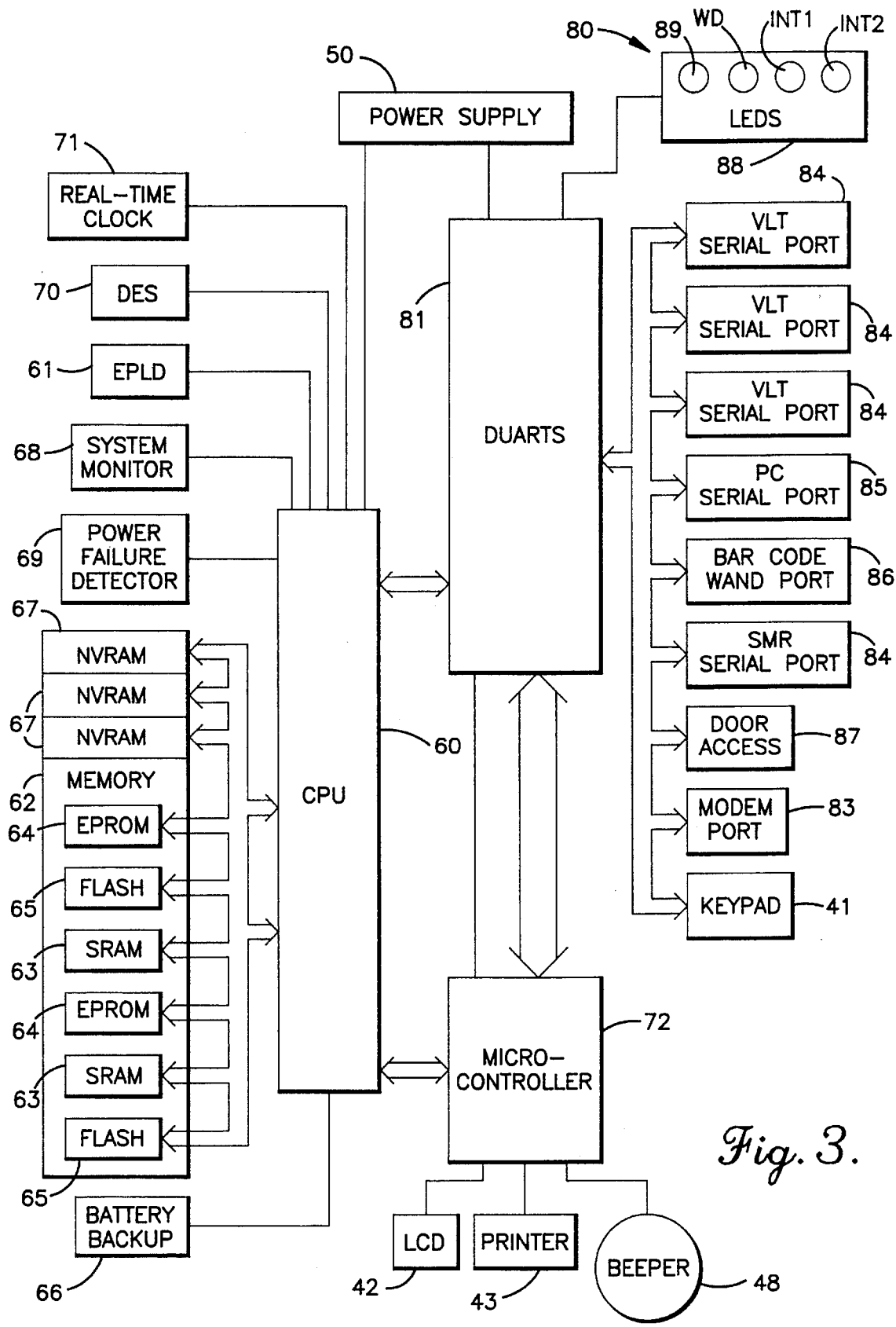
FIG. 3 is a block diagram of the circuitry of the site controller.
Figure 9:
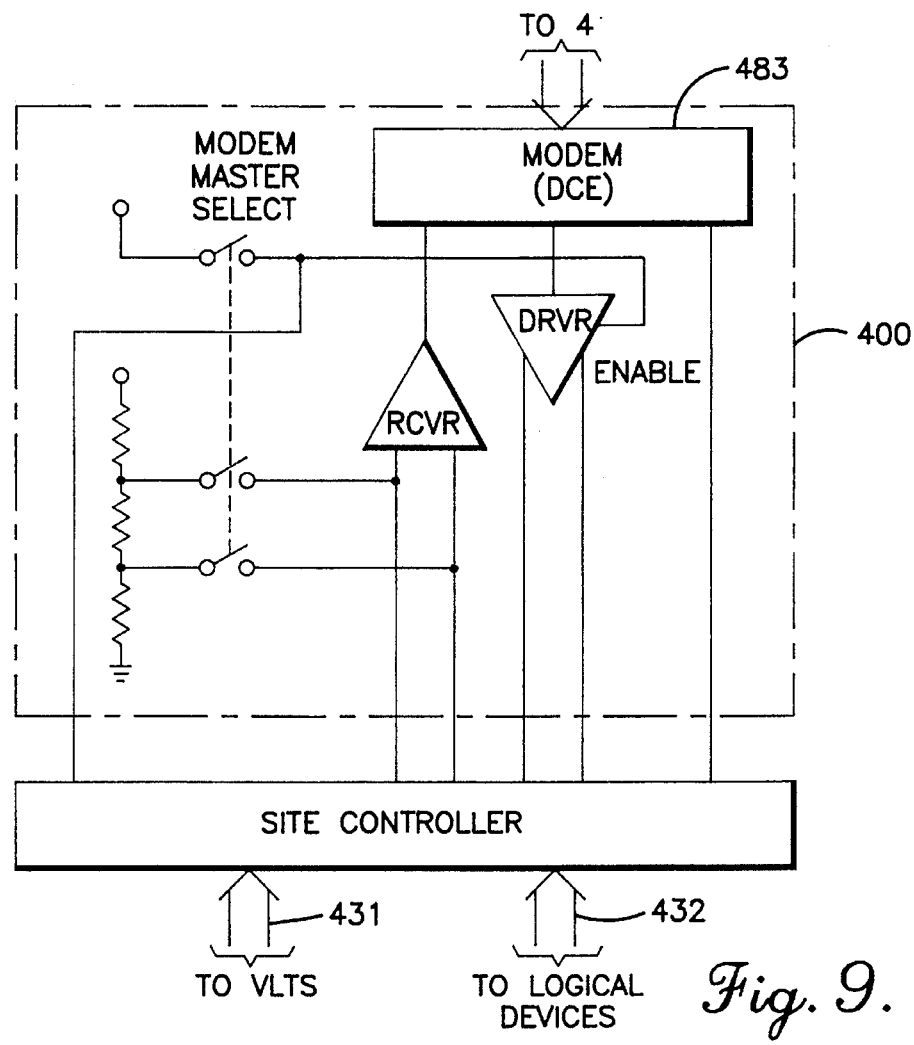
FIG. 9 illustrates a schematic of a site controller with the internal modem assembly.
Figure 10:
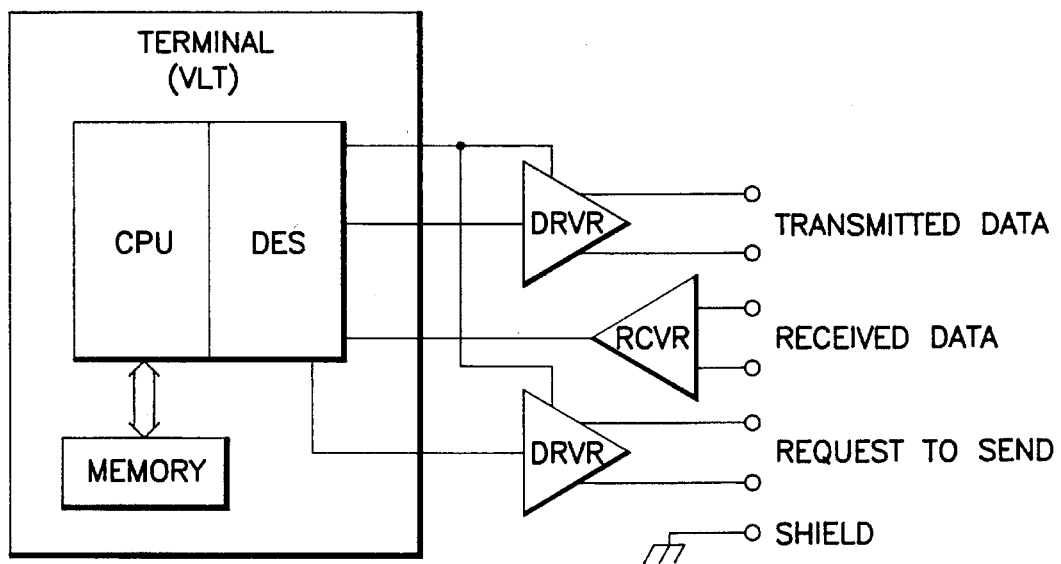
FIG. 10 is a schematic of a video lottery terminal.

FIG. 3 illustrates a block diagram of the internal logic of a site controller 40, while FIG. 9 illustrates the modem assembly within a SC 40. The SC 40 functionally is separated into three sections, a power supply 50, a processor section and an I/O section. The power supply 50 is driven by an external source to provide a 25 watt power supply. The power supply provides a 5 V and a ±12 V source to the processor and I/O sections, and includes a 1 amp slow-blow fuse and an EMI line filter for protection. The external source supply may range between 90 Vac and 265 Vac, 50 and 60 Hz, at 1.0 amp.

The processor section controls the overall operation of the site controller 40. The processor section includes a CPU 600 (such as a Motorola 68000 running at 12 megahertz) which includes a 32 bit processor with a 16 bit data bus and a 24 bit address bus. The CPU 60 interfaces with the I/O section to control multiple serial ports, up to 1 MB of battery backed-up SRAM, 1 MB of EPROM, 512 KB flash memory, 512K NVRAM, an optional internal Hard Drive up to 42 MB, a battery-backed real-time clock and an I/O expansion port. An electronic programmable logic device 61 (EPLD) (such as an Altera EP 1810) provides address decoding and necessary external logic required by the CPU 60 interface with the system.

A memory module 62 includes two SRAM modules 63, two EPROM modules 64, and two flash memory modules 65. Two modules of each type are required for operation with a 16-bit data bus, as used by the CPU 60. The SRAM modules 63 (Static Random Access Memory) provide memory needed for the CPU 60 to operate. The SRAM modules 63 may have densities of 8K×8, 32K×8, 2/8K×8, or 512K×8 bytes, depending upon the memory required by the software. The power supply to the SRAM modules 63 is backed-up by batteries 66 on the site controller 40 so that no information will be lost during a power failure. The SRAM modules 63 are low power CMOS devices with a 2 microamp typical current drain in standby mode.

The EPROM modules 64 (Erasable Programmable Read Only Memory) store the firmware for the site controller 40. The EPROM modules 64 may have densities of 64K×8, 128K×8, or 256K×8 bytes, depending upon the memory required by the firmware. Flash memory or bootblock Flash memory may be substituted for EPROM to provide the same function. The flash memory modules 65 are reprogrammable and are used to store code downloaded from the central site computer 2. The flash memory modules 65 can have densities of 32K×8, 64K×8, 128K×8, or 256K×8 bytes. A NVRAM module 67 (non-volatile Random Access Memory) is used to record ticketing information received from the VLTs 30 and validation information received from the keypad 41. The NVRAM module 67 includes three SRAM memory chips, each which is battery backed-up separately, includes its own unit to detect low battery outputs, provides early warning of impending battery failure and which has a density of 8K×8, 32K×8, 128K×8, or 512K×8 bytes. Each SRAM chip stores the same ticketing and validation information, in order to perform triple redundancy information storage, as explained below. The NVRAM module 67 is removable to allow critical data to be transferred to another site controller 40 or to be recovered through an external means.

The processor section further includes a system monitor 68. (such as a MAX 694) which monitors the voltages supplied by the power source and internal batteries. The system monitor 68 includes a system watchdog timer which, during normal operation, is periodically reset before it times out. The system monitor 68 supplies a reset power signal to the CPU 60 at power up, when the 5 V supply from the power source exceeds it tolerances and when the watchdog timer times out. Within the system monitor 68 an internal comparator monitors the voltage supplied by the site controller's internal batteries 66 and provides a battery failure signal (Bart Fail) to indicate that the battery level has fallen below a desired level.

A power failure detecting unit 69, within the site controller 60, monitors the AC input line voltage and provides advanced warning of an impending power failure. When the AC line voltage drops below 95 Vac, the power failure detecting unit 69 supplies a high priority interrupt to the CPU 60 to afford time to complete ongoing critical operations. When the AC power fails, the power supply 50 continues to provide power to the CPU 60 long enough for the CPU 60 to complete these critical operations.

A data encryption (DES) module 70 provides encryption based on the National Bureau of Standard's Data Encryption Standard (DES) in electronic code book mode as set forth in the Federal Information Processing Standard Publication (FIPS PUB) 81 of Dec. 2, 1980 which is incorporated by reference. The DES module 70 includes a WD20C03A data encryption processor designed to encrypt and decrypt data supplied thereto by the CPU 60 for security purposes. The CPU 60 may directly perform the encryption and decryption processing through software operations, with the dedicated DES module 70 only being necessary for high-speed hardware assisted data encryption. A real-time clock 71 (such as an OKI MSM6264) is used for timekeeping purposes. The real-time clock 71 is battery backed to maintain time during power failures.

The I/O section serves as an interface between the CPU 60 and the central site computer 2, and any devices connected to the SC 40. The I/O section includes a Parallel Interface/Timer (PI/T) subsection and a DUARTs subsection. The PI/T (such as a 68230) controls the LCD display 42 and printer mechanism 43 illustrated in FIG. 2. The LCD display 42 comprises a backlit graphic display with a screen size of 128×64 elements. The printer mechanism 43 (such as an Epsom M180 dot matrix printer) prints on standard 2.25" adding machine tape. This printer mechanism 43 may print up to 144 dots or 24 characters per line and uses a ribbon cassette for inking. The beeper 48 comprises a piezoelectric device that is driven at any desired frequency to create a unique sound.

The DUARTs subsection 80 includes three DUARTs modules 81 (such as Motorola 68681s) to provide communications with external devices. Three VLT ports 82 (such as RS-422 or RS-485 ports) are controlled by the DUARTs modules 81 and interface with the VLTs 30. Each VLT serial port 82 may directly drive up to 50 VLTs 30. With the addition of bus expanders 90 (explained below), each VLT port may be used to drive several hundred VLTs. Generally, no more than 100 VLTs need be connected to each VLT port 82. The VLT ports 82 are driven by asynchronous channels of the DUARTS modules 81 running at 9600 BAUD.

The third DUARTs module controls the second and third VLT ports, and thus need only be included when it is desirable to use these additional VLT ports. To include VLT ports 2 and 3, a site expansion module (not shown) is connected to the site controller. The site expansion module allows the site controller t0 to include an internal modem 83 and other necessary features to expand the modem interface. The modem 83 interfaces with the telephone network 4 to communicate with the central site 2. The modem 83 is controlled by an asynchronous channel of the DUARTs module 81. The modem 83 typically operates at a 2400 BAUD rate, however, may operate at a 9600 BAUD rate.

A site management ring (SMR) port 84 (such as a RS-422 or RS-485 communications port) provides an interface, at the same gaming site, with external management devices and with other site controllers via a site management ring. A PC Port 85 (such as a RS-232 port) is designed to communicate directly with personal computers to provide reports and management functions on the PC having an larger display and full sized keyboard as compared to those of the site controller 40. A printer may also be attached to the PC to provide full sized local reports. A bar code wand port 86 supports a bar code reader (such as a HP HBCS-A100 bar code reader or the equivalent) for reading bar codes on the tickets corresponding to authorization and certification numbers, and payout amounts.

A door access switch 87 detects any attempts to access the site controller 40, even when the power supply 50 is disconnected since the access switch 87 is connected to a battery backup. A signal from the access switch 87 is input and Cleared by the DUARTs module 81. The keypad 41 is connected to the DUARTs module 81, which monitors scan! codes output by a scanning unit that scans the keypad 41 to identify changes in the pressed key.

The LED indicators 88 indicate operating states of the site controller 40. One LED 89 illuminates the word "ONLINE" as an indication of the login status of the site controller. Of the remaining three LEDs, one is labelled WD (i.e., Watchdog) and the other two are labelled INT1 rand INT2. The WD LED flashes to indicate a CPU processing error, while the INT1 and INT2 LEDs flash to identify the "tens" and "ones" digits, respectively, of an error code. For instance, in the event of an error corresponding to error code "54", the WD LED will intermittently flash, while the INT1 flashes five times immediately followed by four flashes of the INT2. This flashing sequence is continuously repeated.

The site controller 40 performs tasks associated with multiple types of logical devices, including a VLT Polling device (VLT PD), a Cash Ticket Validation Console (CTVC), a RPS Communications Handler (RPS CH) and a Ring Master device (RMD). Through multi-tasking, the site controller 40 is able to perform various tasks substantially simultaneously and independent of one another. When performing tasks associated with a VLT polling device, the site controller 40 communicates with VLTs 30 through the VLT serial ports 82 and along the VLT communications buses 31 (FIG. 1). When performing the tasks of a Cash Ticket Validation Console, the site controller communicates (if necessary) with one or more other site controllers along a site management ring (SMR) 32. When performing the tasks of a ring master device, the site controller 40 communicates along, and monitors the integrity of, the SMR 32. When performing the tasks of a RPS Communications Handler, the site controller 40 transfers communications between the telephone network 4, via the modem 83, and the site management ring 32. Each logical device and its associated tasks are explained below in detail.

B. Security Plate

Referring to FIG. 2, the site controller 40 is affixed within a gaming site 3 at a location convenient for the clerk, but not easily accessible to the public. The site controller 40 is mounted on a security plate 90 (FIG. 2) which is bolted to a table or wall to prevent theft or unauthorized access thereto. To mount the security plate 90, wood screws or bolts are inserted through holes 91 in the security plate 90 into the wall. Three guide holes 92 are include on a face of the security plate 90 which align with three mounting heads (not shown) mounted on a backside of the site controller 40. To affix the[site controller 40 to the security plate 90, the mounting heads are inserted into the guide holes 91, firmly pulled forward and secured within the mounting slots 93.

The site controller 40 includes a locking mechanism 94 on the backside thereof which controls a cam locking member 95 protruding from the bottom surface of the site controller 40 when in a locked position. The locking member 95 aligns with a groove 96 in the security plate 90. After securing the mounting heads in the slots 93, the key 44 is locked thereby securing the cam locking member 95 in the groove 96. Once the key 44 is removed, there is no way to remove the security plate 90 from the wall, nor is there any way to remove the top cover from the site controller 40 or to gain access to the internal components of the site controller 40 without severely damaging the unit. Optionally, the security plate may be constructed as a flat unit (without the angled mounting bracket 98) and mounted on a table via holes 97.

III. SITE CONTROLLER—VLT COMMUNICATIONS NETWORK

FIG. 1 illustrates alternative configurations for the site controllers 40 and VLTs 30 at gaming sites 3A–3C. Referring to FIG. 1, the configuration within gaming site 3A is preferable with 25 or fewer VLTs connected to a single site controller The configuration within gaming site 3B is preferable when 25 to 100 VLTs are connected to a single site controller 40B. The configuration within gaming site 3C is preferable when more than 100 VLTs are used at a single point of sale. In gaming site 3A, the VLTs 30A are serially connected to one another and directly connected to the SC 40A via a VLT communications bus 31A. In gaming site 3B, clusters 33B of VLTs are connected, through corresponding VLT communications buses 31B, to bus expanders 34B which are connected in series to a site controller 40BM via the VLT communications buses 33B. The site controller 40BM is connected to a second site controller 40BS along a site management ring 32B. The clusters 33B are combined to form a terminal group 35B of VLTs that is connected to the SC 40BM. In gaming site 3C, groups of VLTs 35C are connected to separate site controllers that are interconnected via a site management ring 32C.

In the gaming sites 3B and 3C, the site controllers 40BM and 40CM perform tasks of a ring master device to manage the site management rings 32B and 32C. In gaming site 3B, the SC 40BM is also designated to perform the tasks of a master VLT polling device, namely it stores cash ticket records for every cash ticket generated by a VLT. Also, the gaming site 3B includes a site controller 40BM that performs the tasks of a master cash ticket validation console, while the site controller 40BS functions as a slave validation console. In gaming site 3C each SC is separately connected to a group 35C of VLTs and each SC stores cash ticket records for the VLTs connected thereto. In gaming site 3C, since each SC stores its own cash ticket records no SC operates as a master cash ticket validation console.

Figure 4B:
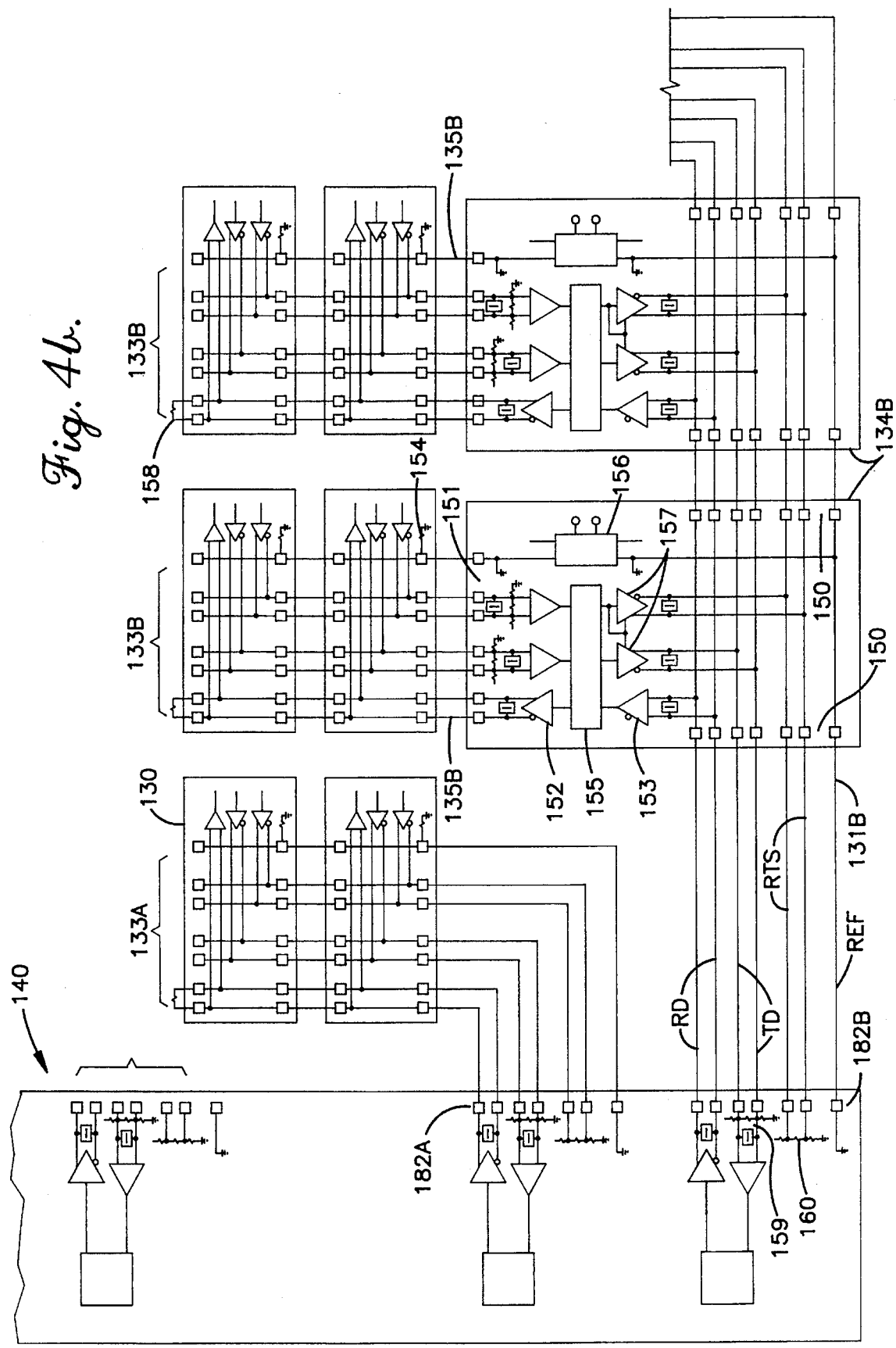
Figure 4C:
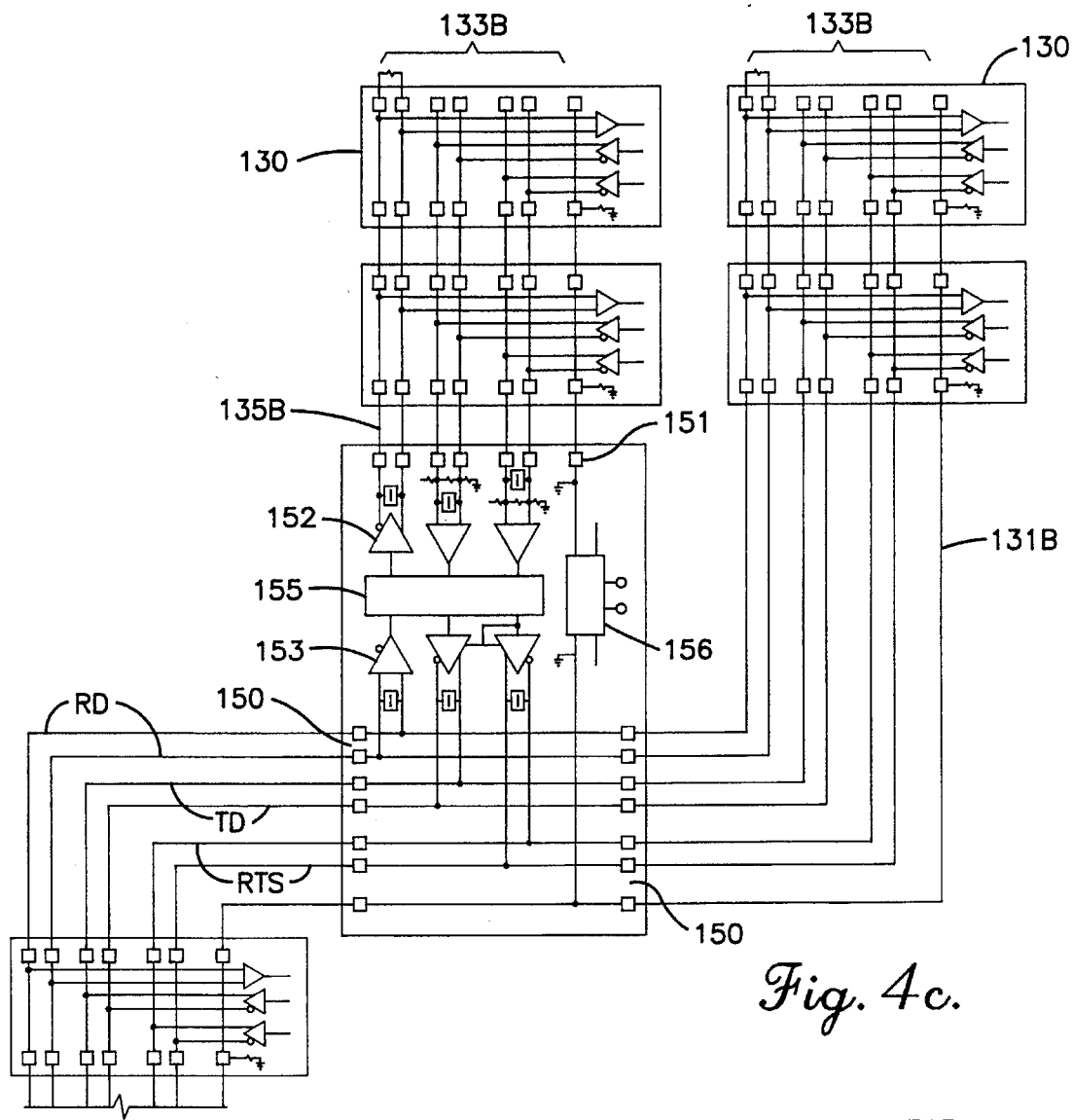

FIGS. 4a–4c illustrate a detailed communications network in which clusters of VLTs 133A and 133B (FIG. 4b) are connected to two VLT ports 182A and 182B in a single SC 140. The SC 140 is also connected to the modem 183 via a serial port 83 (FIG. 4a). Within the VLT communications bus 131B, multiple clusters of VLTs 133B are connected via bus expanders 134B. As illustrated in FIG. 4b, the first VLT port 182B is connected in series with two bus expanders 134B, each of which is connected along auxiliary buses 135B to clusters of VLTs. While the bus expanders 134B allow hundreds of VLTs to be connected to a single site controller, it is preferable that no more than 48 VLTs are directly connected with a single bus expander or directly to a single site controller VLT polling bus. If additional VLTs are needed, these VLTs are segmented into clusters of 48 or less and connected to an appropriate number of bus expanders and to additional VLT polling buses on a site controller. Also, due to internal line resistance, it is preferable that the last VLT in each cluster of VLTs, connected to a bus expander or SC, is separated by no more than 4000 ft. of cable from a bus expander or SC. The capacity of the bus expander 134B is limited only by the operational BAUD rate of the bus and by the poll cycle response time required by any individual VLT.

A. Bus Expander

Referring to FIG. 4b, the bus expander 134B functions as a repeater which provides a means to interconnect a virtually unlimited number of VLTs onto a single VLT communications bus. Each bus expander 134B includes two identical primary ports 150 and one auxiliary port 151. The primary and auxiliary ports 150 and 151 are implemented with the same type of connector as the serial ports 182A-B within each site controller and within each VLT 130 (such as a DB-15 connector, 7 pins of which are utilized). Corresponding pins within each primary port 150 are directly wired to one another, such that each bus expander 134B may be connected in series with the VLT communications bus 131B to provide a daisy chain configuration. The auxiliary port 151 uses 7 pins of the connector which are connected, via drivers 152 and 157, and receivers 153, to corresponding lines within the VLT communications bus 131B.

The primary and secondary ports 150 and 151 include a ground line REF and three pairs of data transmission lines, including transmit data lines TD, receive data lines RD, and request to send lines RTS. The ground reference line REF is referenced to logical ground of the drivers and receivers within each VLT through a resistor 154 of approximately 270 OHMS. Each set of data transmission lines has a differential signal for high noise immunity. The site controller 140 drives the receive data lines RD which are continually monitored by every VLT. The VLTs transmit along the transmit data lines TD to the site controller 140. When not transmitting, each VLT maintains its transmit data and request to send lines, TD and RTS, in a tri-state (i.e., in a state of high impedance), in order to free-up these lines for other VLTs.

Within each bus expander 134B, the receive data lines RD of the primary and auxiliary ports 150 and 151 are connected via a receiver 153, an optical isolation component 155 and a driver 152. The drivers 152 and receivers 153 are identical to those in the site controller and in each VLT, to ensure that every bus expander and VLT provides the same load on the bus. The optical isolation components 155 and the power isolation component 156 within the ground line REF provides power and data isolation on either side thereof to limit the length of any "antennae" effect that is created by any individual communication bus. The request to send lines RTS from the auxiliary bus 135B enable the TD and RTS drivers 157 to allow information on the transmit data lines TD of the auxiliary bus to be relayed onto the primary bus 150. Thus, the TD and RTS drivers 157 are directly enabled only by the VLT that is currently transmitting data, while all other TD and RTS drivers connected thereto maintain a tri-stated condition.

The VLT communication buses 131 enable one modem to be used at a point of sale, while still allowing a limitless number of VLTs to communicate with the central site computer 2. The VLT communications buses 131 operate at 9600 BAUD and are based upon the EIA RS-422 bus standard, with the only deviation being that the drivers and receivers comply with the specifications of EIA RS-485 compatible devices. This enhancement permits more VLTs to be connected to the VLT communications bus while taking advantage of the lower input current requirements of the RS-485 receivers and the higher output current capabilities of the RS-485 drivers. The site controller at the points of sale which controls the modem connection to the central site 2 is referred to as a modem master.

Each line within the VLT communications buses 131 should be terminated with an approximately 180 Ohm resistor to improve the noise immunity of the bus by creating a lower impedance transmission line. As to the received data lines RD, this termination resistance is most effective when placed across the input leads of the VLT receiver which is farthest from the related SC or Bus expander transmitter. Thus, as illustrated in FIG. 4B a termination resistor 158 has been connected across the receive data lines RD of the last VLT in each cluster. To terminate a bus, a termination plug, having the termination resistor 158, is inserted into the unused bus connector of the appropriate VLTs. The transmit data lines TD and request to send data lines RTS are also terminated in the site controller 140 by including termination resistors 159 and 160, respectively, between the data lines TD and RTS within each VLT serial port.

Additionally, the site controller 140 establishes a known state on the transmit data lines TD and the request to send data lines RTS when the receivers are tri-stared. This state is maintained by inserting a 1K Ohm pull-up resistor between a 5 V source and one wire within the transmit data lines TD. Also, a 1K Ohm pull-down resistor is connected between logical ground and the other wire of the transmit data line TD. A 270 Ohm resistor is inserted between the wires of the transmit data lines TD. The request to send lines RTS are terminated in each bus expander using the above described pull-up and pull-down resistor combination.

B. Site Controller—VLT Communications Protocol

Site controllers and VLTs communicate through the VLT communications bus by transmitting and receiving communications packets. The communications packets consist of two types—those with data and validation segments (i.e. gaming information) and those without data and validation segments. The basic communications packet without data or validation segments follows:

COMMUNICATION PACKET
without data or validation segments

| Header Code (1) | VLT ID (2) | Command Segment (2) | CRC Code (2) | Trailer Code (1) |
|---|---|---|---|---|

The above illustration identifies each segment name within the basic packet format and the number of bytes therein. The header and trailer codes are fixed byte values, such as $ 05 and $0D, and identify the beginning and end of each packet. (The '$' preceding the number indicates a hexidecimal number.) The VLT ID serves as a unique address for each VLT. The VLT ID for each terminal is stored in ROM within the terminal. The command segment identifies the type of command being transmitted in the packet. Examples of command types include a Cash Ticket Transaction Request/Reply, Data Write Request/Data Read Reply, Site Info Reply, ACK/NAK, Data Read Request, Poll/Status Response and Site Info Request. These commands are explained below.

As illustrated below, the communications packet format with data and validation segments is identical to the basic packet format, except that the data and validation segments have been added after the command segment.

COMMUNICATIONS PACKET
with data and validation segements

| Header Code (1) | VLT ID (2) | Command Segment (2) | Data Segment (8-256) | Validation Segment (8) | CRC Code (2) | Trailer Code (1) |
|---|---|---|---|---|---|---|

The data segment allows information to be uploaded and downloaded to and from the VLT. Three types of commands include data segments, Cash Ticket Transaction Request/Reply, Data Write Request/Data Read Reply, and Site Info Reply. The data fields for each of these three types of commands include multiple data formats, for instance, the Cash Ticket Transaction Request/Reply includes two data formats, a Cash Ticket Request from a VLT and a Cash Ticket Reply from a SC. The Data Write Request/Reply command includes seven data formats written to and read by each VLT, namely control, configuration, date and time/memory signature, banner/report, monitor, statistics and events log data formats. The Site Info Reply also includes seven data formats transmitted by each VLT, namely VLT control, configuration, date and time/memory signature, banner/report, monitor, statistics and events log data formats.

Every packet containing a data segment also includes a validation segment to verify the integrity of the data segment. The validation segment is divided as follows:

VALIDATION SEGMENT

| Date (2) | Time (2) | Random Validation Code (2) | Validation Code (2) |
|---|---|---|---|

The validation segment includes date and time stamps, a validation seed which represents a random number between 0 and 65,520 that is generated by the VLT or SC transmitting the packet. The validation code is based on the validation seed and is calculated by VLTs and SCs as follows. First, the validation seed is multiplied by 65,536 (i.e. shifted left 16 bits) and logically OR'd with the VLT ID (i.e., the second and third bytes of the packet) thereby providing a 32-bit number. The 32-bit number is then divided by 65,521 (a prime number) and the quotient is discarded. The remainder is then shifted left 16-bits and OR'd with the next two bytes of the packet following the VLT ID and divided again by 65,521. The VLT and SC continue this process over all of the bytes in the packet through the end of the data segment. The resulting 16-bit remainder constitutes the validation code.

The following Table 1 sets forth the formats for the most commonly used command types followed by an explanation of the commands and of the variables used therein.

TABLE 1

| Command Type | Command Format |
|---|---|
| Poll Command | cccv dfpi uuuu uuss |
| Status Response | cccu deee eeee ubss |
| Data Read Request | cccu uuuu rrrr uqss |
| Data Read-Reply | cccn nnnn rrrr uqss |
| Site Info Request | cccu uuuu rrrr uqss |
| Site Info Reply | cccn nnnn rrrr uqss |
| Data Write Request | cccn nnnn wwwo uqss |
| Cash Ticket Transaction Request | cccn nnnn tttt uqss |
| Cash Ticket Transaction Reply | cccn nnnn tttt uqss |
| ACK/NAK | ccca aaaa kkko uqss |

The a-bits represents the acknowledge (negative acknowledge) code and identify a reason, if any, that a negative acknowledge command is being sent. The b-bit, when set, indicates to the SC that a VLT has a packet containing data that is ready to be sent, thereby allowing the SC to schedule permission for the data packet transfer. The c-bits identify the command type. The d-bit controls the game play state of the VLT by enabling/disabling normal game play. The e-bits represent an exception code and identify a detected exception condition which is being reported by the VLT. VLTs report exception codes in the order detected.

The f-bit, when set, forces the VLT to send a Status Response indicating whether or not a state of the VLT has changed. The i-bit, when set, indicates that a Transaction Request from the VLT is currently in progress and that a Transaction Reply is forthcoming. The k-bits identifies the command type being acknowledged. The n-bits identify the length of a data segment included within the packet. Data segments are in 8-byte increments. The p-bit, when set, permits the VLT to transmit a packet containing data (such as a cash out Transaction Request or a Status Response). Otherwise, the VLT is only allowed to respond with commands not containing data. The r-bits identify the data type requested. The s-bits are used to identify the source of the communications packet. The u-bits designate unused or undefined bits. The v-bit toggles states to acknowledge receipt, by the SC, of the last Status Response sent by a VLT. The VLT tracks the value of the v-bit to determine if the last Status Response sent to the SC was properly received.

The Poll command is transmitted by the SC and is used to control communications along the VLT communications bus. The VLTs only transmit packets along the bus when polled by the sate controller (i.e. only when a VLT receives a Poll Command addressed to it). The Poll command controls the flow of communications by limiting the types of commands that the VLT may transmit in response to a Poll and also by controlling the game play enable status.

Specific SC configurations will conduct a continuous poll of all VLTs, while other SC configurations will only have polls conducted to solicit a response to a request. In either case, the action taken by the VLT in response to a Poll is identical. While a VLT is expected to transmit packets only immediately following a Polled command addressed specifically to it, full-duplex communications will take place on the VLT communications bus. That is, the SC will at times send "non-poll" packets (Data Read/Write Requests, Site Info Request, ACK/NAKs, and/or Transaction Replies) to another (different) terminal while the VLT currently being polled is responding. For efficient communication flow, the SC may have multiple data-type transfer activities in process to a single VLT. The VLT is capable of "simultaneously" (before all aspects of the data transfer are complete) processing a Data Read (or Write) Request, a Site Info Request, and a Transaction Reply. For instance, the VLT may receive a Data Read Request and, before the Reply is transmitted, also receive a Site Info Request, and/or a Transaction Reply.

The Status Response command is transmitted by a VLT to report the occurrence of an exception condition detected by the VLT (e.g., events log full, coin acceptor tilt, bill acceptor tilt, coin hopper empty, cash door open, substantial win, substantial cash payout, etc.). Status Response commands are also transmitted in respond to a forced Poll command from the SC. The VLT is expected to report exception conditions in the order detected and only once while they persist. Some exception conditions are singular events (substantial win), while others (door open) have associated resolution events (all doors closed) that must be reported when the condition is concluded or corrected.

The DATA Read Request command is transmitted by the SC to request a specific type of data from a VLT. The Read Request does not contain a data segment. The VLT is expected to reply on a subsequent poll cycle with a Data Read Reply command to upload data to the SC. The data type code in this reply echoes that of the original request. The data type codes include Control, Monitor (for terminal at end of last day), Configure, Statistics (for terminal at end of last week), Banner/Report, Monitor (current terminal values), Statistics (current), Terminal Event Log, Date and Time/Memory Signature, and Continuation Packet data. If multiple packets of data are required in the Data Read Reply to answer a request, the continuation packets contain the data type code rrrr=1111. The SC indicates acceptance of all but the last packet by sending ACKnowledge commands. The VLT tracks the flow of multi-packet replies to confirm that the SC received each packet.

The Site Info Request command is sent by the SC and is used to request a specific data type from the VLTs. The Info Request does not contain a data segment. The designated VLT uploads data to the SC through one or more Site Info Replies in almost exactly the same way as in Data Read Replies. In multi-packet transfers, the SC again acknowledges all but the last packet of a Site Info Reply with an ACK or NAK.

The Data Write Request command is transmitted Dy the SC and is used to send control and configuration (non-transaction type) data to a VLT. The addressed VLT is expected to respond to each packet with either an ACK or NAK command, but only in response to a subsequent command from the SC.

The Cash Ticket Transaction Request command is transmitted by a VLT, in response to a poll command, to initiate a cash payout transaction with the SC. The SC will either respond with a Cash Ticket Transaction Reply or with a transaction NAK, or acknowledge that a transaction is in progress by setting the i-bit in the next Poll command to that VLT. If one of these cases in not met, the VLT will re-initiate the same transaction. A transaction number, sequentially assigned by the VLT and included in the data segment, is used to confirm the related Transaction Reply from the SC. The Cash Ticket Transaction Request contains a data segment having the following format:

| Cash Ticket Format ID (1) | Reserved (1) | Transaction Number (1) | Reserved (1) | Cash Out Amount (4) |
|---|---|---|---|---|

The data segment of the Cash Ticket Transaction Request includes 8 bytes, the second and fourth of which are reserved. The first byte identifies the data segment format ($05), while the last four bytes identify the current VLT credit balance to be cashed out. The third byte identifies the specific number assigned to this transaction by the VLT (0–255).

The VLT assigns this transaction number in a sequential fashion for each new transaction but only increments this number when the VLT receives a cash ticket reply echoing this number. If the VLT has not received a valid reply or error code by the time the i-bit within the poll command has returned to zero, the VLT will re-queue and re-send the same transaction request until a legitimate response is received. If a transaction error NAK is received, the transaction is aborted without incrementing the transaction number.

The Cash Ticket Transaction Reply command is transmitted by a SC, in response to a the cash ticket request and contains information that the VLT must print upon the cash ticket and enter into its event log. This printed information is later used to validate the ticket when presented by the player for redemption and to track the ticket throughout the video lottery system. The cash ticket reply includes a data segment having the following format:

| Cash Ticket Format ID (1) | Reserved (1) | Transaction Number (1) | Venue ID (3) | Cash Out Amount (4) |
|---|---|---|---|---|
| Date Ticket Issued (2) | Time Ticket Issued (2) | Cash Ticket Number (2) | Security Number (2) | Reserved (6) |

The data segment of the cash ticket reply includes 24 bytes, of which bytes 2 and 19–24 are reserved. The ticket format ID, transaction number and cash out amount are echoed from the cash ticket request. The venue ID uniquely identifies the gaming site. The cash ticket number and ticket issue date and time are assigned by the SC and are printed on the cash ticket. The security number is a random number generated by the SC. The above commands, as used in connection with a cash ticket generating operation, are explained below in the VLT Cash Ticket Generation Scheme (Subsection D).

C. Site Controller—VLT Encryption Scheme

As explained above, the data packets passed along the main communications bus consists of two distinct segments, a data segment, and a validation segment. To protect the data and validation segments from undetectable corruption, prior to transmission, both are encrypted and decrypted using the National Bureau of Standards data encryption standard in electronic code book mode (hereafter DES). Under the DES technic, the transmitting device (VLT or SC) encrypts and the receiving device (SC or VLT) decrypts a data packet based on a 56-bit key known to both devices. To further augment security, the present invention uses separate keys for the data and validation segments. These keys are always processed within the video lottery system as a key pair (i.e., each data segment key has a one-to-one relation with a specific validation segment key).

The present invention utilizes multiple key pairs. Each VLT maintains two sets of key pairs, the first set representing a current key pair, to be used by the VLT for decryption, and the second key set representing a new/pending key pair not currently being used. After a VLT receives a data packet and before processing the data, it mush first verify the integrity of the data segment by checking the validation segment. The VLT must also verify that the correct key pair is being used to decrypt the data and validation segments. It accomplishes both functions by attempting to verify the contents of the validation segment according to the process of FIG. 5.

Figure 5:
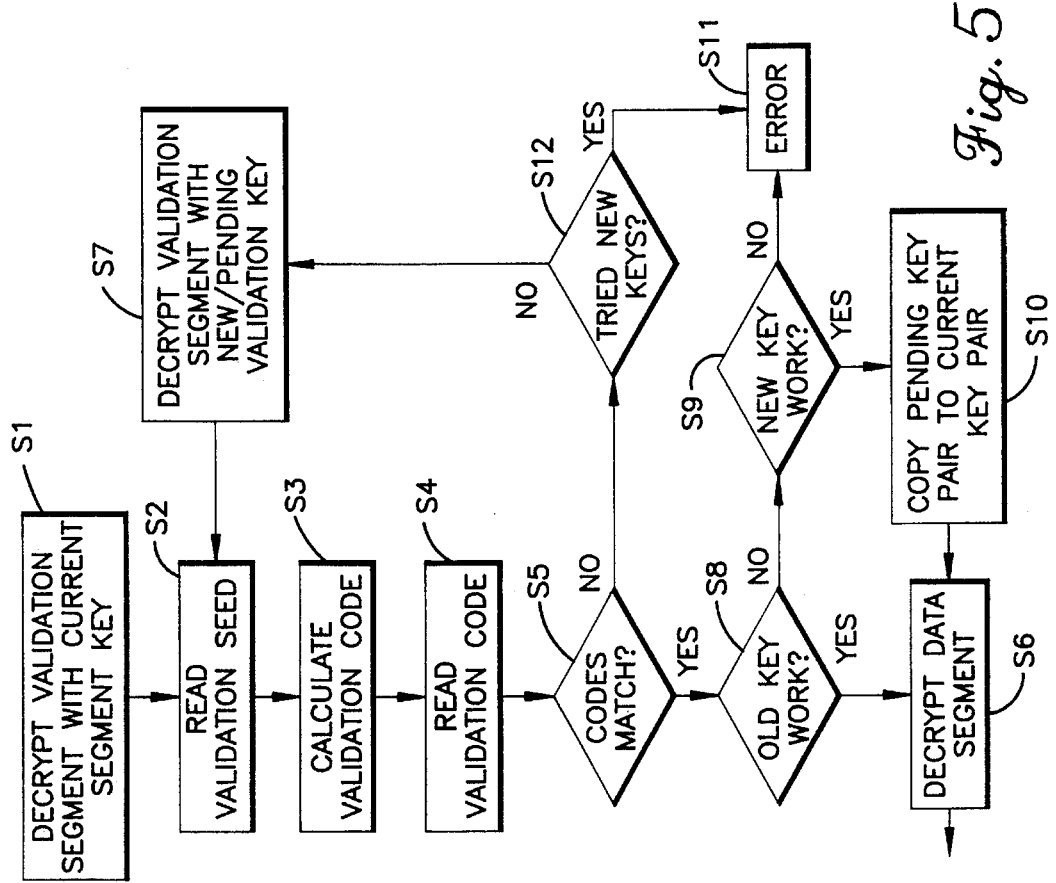
FIG. 5 is a flowchart showing the process by which a video lottery terminal validates an encrypted data packet.

Referring to FIG. 5, the VLT decrypts the validation segment (step S1) using the current validation segment key. Next, the VLT reads the validation seed from the decrypted validation segment (step S2) and calculates a validation code (step S3) based on this seed by using the same process as performed by the SC to generate the validation code as explained above in connection with the validation segment format. Then, the VLT reads the validation code from the decrypted validation segment (step S4) and compares it with the newly calculated validation code (step S5). If they match, the validation segment is deemed to have been decrypted properly and the current key pair is deemed correct. In other words, the received data packet was encrypted using the VLT's current key pair (step S8). Subsequently, the corresponding data segment key is used to decrypt the data segment (step S6).

If the decrypted and newly calculated validation codes do not match, then the current validation segment key (and thus the corresponding data segment key) is deemed unsuitable for the scheme used to encrypt the received data packet. Accordingly; the VLT repeats the above validation process using the new/pending validation segment key (step S8), namely the VLT again decrypts the validation segment with the new/pending key, recalculates the validation code based on the new validation seed, and compares the newly calculated and decrypted validation codes. If the codes do not match, the VLT discards the data packet as an error (S11). If they do match, the received data packet is deemed to have been encrypted using the new/pending key pair. Accordingly, the VLT copies the pending key pair to the current key pair (steps S9 and S10). The VLT now decrypts the data segment using the newly established data segment key (step S6). The VLT uses the current key pair for all subsequent transmissions and receptions (step S10) until a data packet is received that is encrypted using a newly established pending key pair.

The VLT switches to the new/pending key pair each time it receives a data packet that passes the validation check using the new/pending key pair. Without this validation check, the VLT would be unable to verify that the data segment was properly decrypted. Thus, by using key pairs such that a data key change always occurs when the validation key has changed, the site controller and VLT can remain in sync and use the same key pairs.

When the above validation check fails with both the current and new/pending key pairs, the VLT reports a validation code error (steps S11 and S12). To recover communications when an unkown key pair has been established in the VLT, each VLT includes means for a qualified person to reset the current set of keys to the default values. This reset procedure requires access to the logical circuitry within the VLT. This resetting action also causes the previously, current set of keys to be stored as the pending key set before resenting the current key set to default values. This operation allows successful access to the VLT if it uses the previous current key set or the default key set.

Figure 6:
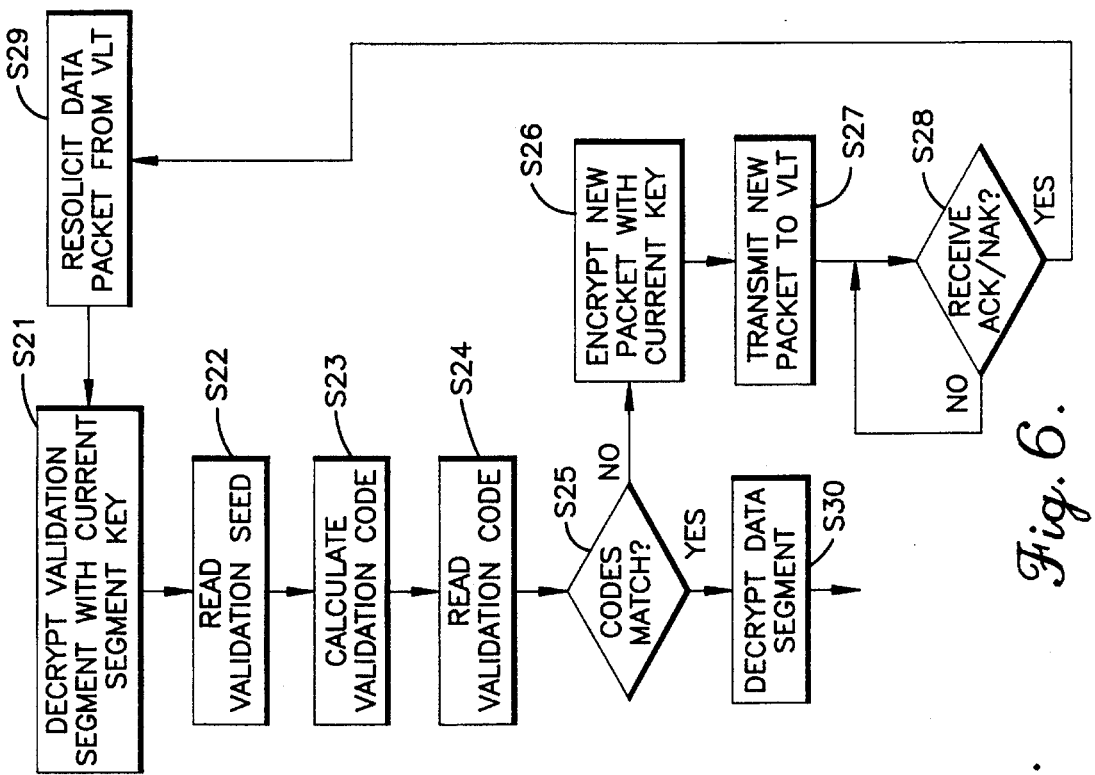
FIG. 6 is a flowchart showing the process by which a site controller validates! an encrypted data packet.

The site controller has a mechanism to force the VLT to change to a newly established pending key pair. Referring to FIG. 6, when a data packet is transmitted by a VLT, the site controller performs a validation check in the same manner as the VLT (steps S21–S25). However, if the validation check fails, the site controller does not repeat the validation check with a new/pending key. Instead, the site controller builds and encrypts a new data packet (such as a time and date packet) with the site controller's current key (step S26). Next, the SC transmits the newly encrypted data packet back to the same VLT (step S27). When this newly encrypted data packet is received, the VLT performs the above validation check illustrated in FIG. 5. The validation process in the VLT proceeds as desrcibed above, causing the VLT to change to the proper key pair for subsequent communications. After the VLT changes key pairs, and sends an ACK/NAK command to the SC (step S28), the SC re-solicits the original data packet sent by the VLT (Step S29). The VLT encrypts the re-solicited data packet using the current key pair, thereby ensuring that the proper key pair is used to encrypt the data segment and it can be decrypted properly.

During an initializing operation on each VLT, the host computer transmits a configuration data segment containing an encryption key subsection that contains the new/pending key pairs. The encryption key subsection of the configuration data segment also contains encryption control flags that identify the which segments of communications packets sent to and from VLTs are encrypted. Data segments need not be encrypted to be secured from corruption, but the corresponding validation segment must be encrypted to maintain security. To identify which key of the encryption key pair to apply, the segments of communications packets separated into two categories as follows:

Category #1=data segments for all Data Read Replies and Data write Requests except for the Date and Time/ Memory Signature data type.

Category #2=validation segments of all data types and the data segments for the Cash Ticket Transaction Request/ Reply, Site Info Request/Reply, the Date and Time/ Memory Signature Data Read Reply and Data Write Request.

Encryption for these categories of data is enabled and disabled by the encryption control flags in the encryption subsection of the configuration segment which is transmitted to each VLT during initialization. The following Table 2 illustrates these control flags and their control over encryption of Categories #1 and #2, and also their control over encryption of the encryption subsection of the configuration segment itself.

TABLE 2

| flag bits | | | Encryption Category #1 | Encryption Category #2 | Configuration Segment Encryption Subsection |
|---|---|---|---|---|---|
| 7 | 1 | 0 | Data Segments | Segments | Subsection |
| 1 | 0 | 0 | OFF | OFF | OFF |
| 0 | 0 | 0 | OFF | OFF | ON |
| x | 0 | 1 | ON | OFF | ON (with data) |
| x | 1 | 1 | ON | ON | ON (with data) |
| 0 | 1 | 0 | OFF | ON | ON |
| 1 | 1 | 0 | OFF | ON | OFF |

A new VLT includes encryption control flags set to 0 and a first encryption key pair set to default values. Each VLT contains two sets of encryption control information, including the encryption control flags and key pairs, one set of which represents the current key pair information and one of which represents the new/pending key pair information.

D. Site Controller—VLT Cash Ticket Generation Scheme

Figure 7:
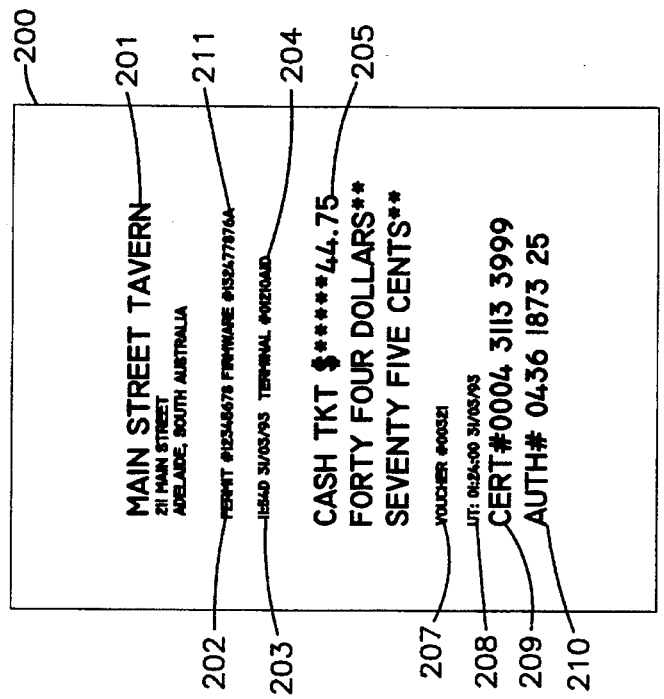
FIG. 7 illustrates a cash ticket generated by a terminal within the present system.

Next, the operation of the system is set forth describing the procedure by which a VLT and a site controller generate a cash ticket as illustrated in FIG. 7. The cash ticket 200 includes the name and address of the gaming site 201, the permit number 202, the issue date and time 203, the terminal number 204, the cash ticket amount 205, the voucher number 206, the local date and time 208, the certification number 209, the authorization number 210 and the firmware number 211.

This scheme is initiated when a player completes play and elects to cash out through a "Cash Ticket Option" provided by the VLT. To provide security and control over the cash ticket process, prior to actually printing a cash ticket, the VLT must successfully complete a Cash Ticket Transaction with the correspondingly connected site controller. Once a player elects to cash out, the VLT waits for the next Poll command from the site controller addressed thereto and, if permitted by this poll, transmits a Cash Ticket Request. As explained above, the VLT includes, within the request, the cash out amount and a transaction number identifying the current cash out transaction. The VLT also calculates and includes a validation segment within the request using the method explained above in connection with the validation segment format. The VLT encrypts the data and validation segments of the Cash Ticket Request if directed to do so by the encryption control flags transmitted during initialization (i.e., if encryption is enabled by the encryption control flag of the encryption section of the configuration segment).

The site controller receives the Cash Ticket Request, decrypts this request (if encryption is enabled), and checks the validation segment according to the process of FIG. 6. Specifically, the VLT first reads the validation seed, calculates therefrom a validation code and compares this newly calculated code with the validation code in the validation segment. If they match, the validation date and time stamp is checked to determine if it differ from the current data and time by more than plus or minus 10 seconds. If the date and time stamp differs too greatly, the packet is not accepted by the site controller and a date and time packet is sent to the VLT to correct its date and time. The VLT must then re-initiate the cash out transaction with the corrected date and time.

If the newly calculated validation code does not match the code within the validation segment, then the SC determines that the VLT and SC are not using the same encryption key. Thus, the site controller transmits a communications packet (such as a Date and Time command) to the VLT. The communications packet is encrypted using the site controller's current key. As explained above in the Encryption Subsection, the VLT receives and decrypts this packet and changes to the new key pair, thereby ensuring that the VLT and site controller contain the same current key pair.

Next, the VLT re-transmits the Cash Ticket Request to the site controller and the site controller again attempts to decrypt and validate the request. If the request successfully validates, the site controller creates and stores a cash ticket record in a cash ticket log contained in the NVRAM module 67. The cash ticket record includes the cash out amount, the date and time at which the cash ticket was created by the SC, a unique gaming site ID, a sequential cash ticket number, and a random security code.

Figure 13:
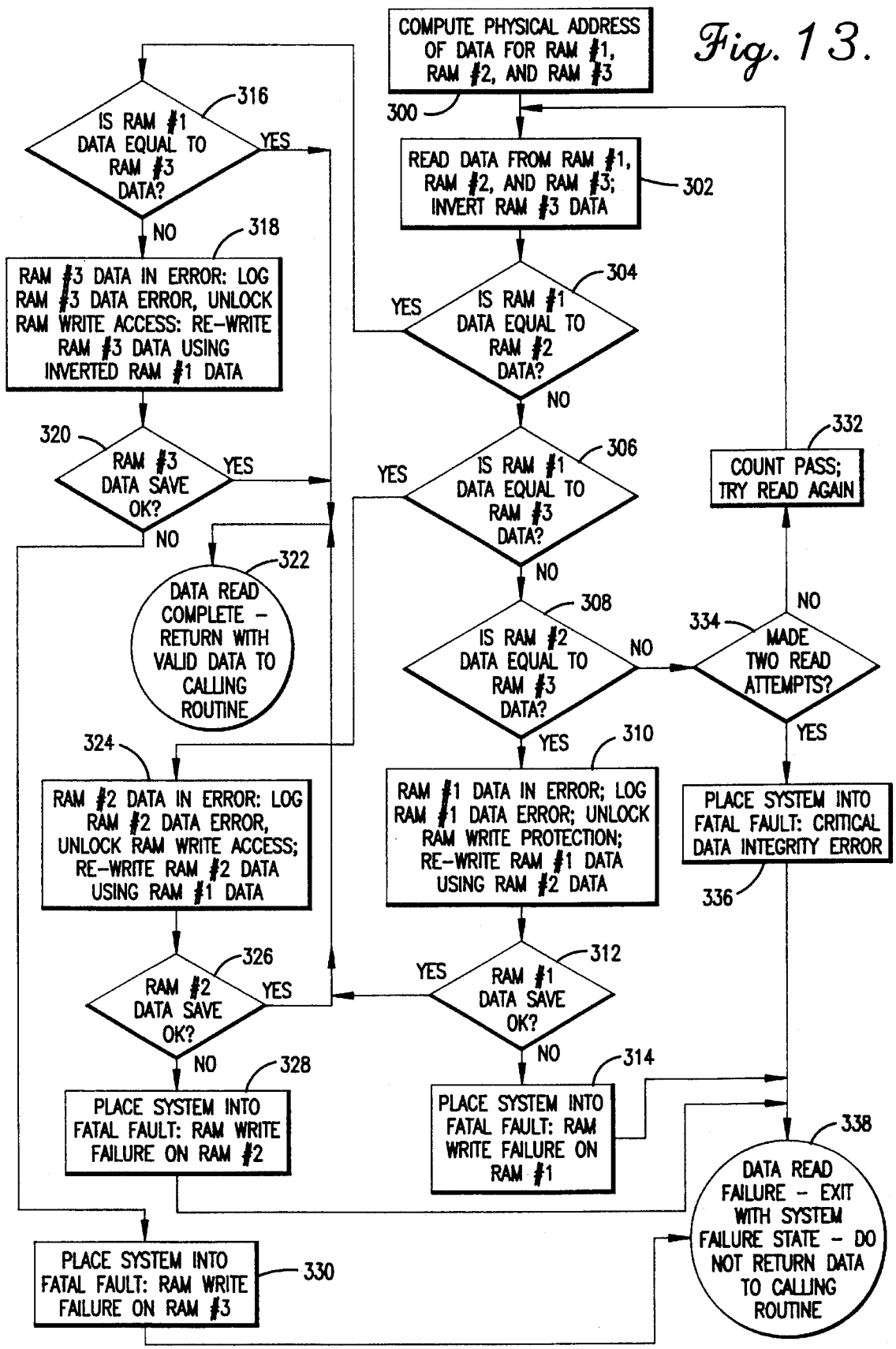
FIG. 13 is a flowchart showing the process by which a site controller performs triple redundancy storage.

When recording the cash ticket record, the CPU 60 performs triple redundancy information storage (as illustrated in FIG. 13) by storing identical cash ticket records in each of the three SRAM modules. Initially, the CPU 60 computes the addresses and stores the cash ticket record data elements at those addresses within the three SRAM modules of the NVRAM 67. After each data element storage in each SRAM module, the CPU 60 reads the data element back from the SRAM module and compares this with the value which was stored. Each data storage is thus verified to be correct immediately after the storage process. If any data storage within an SRAM module does not verify, the SRAM module is deemed to be bad and site controller operation is halted to prevent further incorrect data storage and hence data corruption.

Whenever subsequently reading data stored in the three SRAM modules, the CPU 60 verifies the data integrity (see the flowchart of FIG. 13). Initially the CPU 60 computes the address of the data element to be read (step 300) and reads the data from all three SRAM modules (step 302). All three copies of the data are compared (steps 304, 306,308, and 316) and as long as at least two of the copies match, the CPU 60 accepts the data as the matching value. If one of the Copies is in error, but the other two are the same, the CPU 60 attempts to correct that SRAM module copy using the value read from the other two SRAM modules (steps 310, 318, and 324).

More directly, if SRAM #1 does not equal SRAM #2 or SRAM #3, but SRAM #2=SRAM #3, then SRAM #2 is in error and rewritten from SRAM #2 (step 310). Similarly, SRAM #2 is in error and re-written (step 324) if SRAM #1=SRAM#3, but does not equal SRAM #2. SRAM #3 is in error and re-written (step 318) if SRAM #1=SRAM #2, but does not equal SRAM #3. If no two SRAMs equal, the CPU 60 re-reads all three SRAMs (steps 332 and 334) a second time and re-compares them and if again unsuccessful, it places the system into a fatal fault condition (step 336). Also, if the CPU 60 identifies one faulty SRAM module but is unable to save data correctly (steps 312, 320 and 326) to that module, the CPU 60 again places the site controller in a fatal fault condition (steps 314, 330 and 328).

Additionally, since external devices may be required to store data in the NVRAM 67, the CPU 60 stores one of the three identical cash ticket records (in SRAM #3) in a complimented state to ensure that any external device is not corrupting the cash ticket records. When stored in this manner, the CPU 60 re-inverts (step 302) data from the SRAM #3 after being read. During a read/write operation between the CPU 60 and the NVRAM, each of the three copies are transmitted separately through the external device. If faulty, the external device will alter all three copies prior to being restored in the NVRAM. Consequently, the complimented record will no longer represent the compliment of the non-compliments records. Thus, any subsequent comparison will result in a difference between the complimented and non-complimented records. When the CPU 60 attempts to correct the bad copy, it will likely fail and the site controller will be shut down before the faulty external device extensively corrupts the cash ticket log.

After recording the cash ticket record in the NVRAM 67, the site controller transmits a Cash Ticket Reply to the VLT, which echoes the transaction number and cash payout amount, along with the date and time at which the ticket was issued, the gaming site ID, the sequential cash ticket number, and the random security code.

The VLT receives the Cash Ticket Reply, decrypts and validates it, and prints a cash ticket. Printed on the ticket is the issue date and time, a 12-digit certification number, and a 10-digit authorization number. The certification number is made up by the VLT from the gaming site ID and the date (in a Julian format). The VLT forms the authorization number from the sequential cash ticket number and the random security code.

The combination of the certification and authorization numbers render the cash ticket unique throughout the entire Video Lottery System and provide a means for authenticating the ticket from anywhere within the system. Both numbers are required for this uniqueness to be achieved. Since the cash ticket sequence number in the site controller is reset to 1 at the start of each day, within the probability of the random number range, two or more cash tickets, all from different days, may have the exact same authorization number. Also, two cash tickets from different sites may have the same authorization number. If this is the case, the certification number is then required to determine which cash ticket is to be redeemed. The combination of authorization and certification numbers guarantee uniqueness because the certification number contains the date the ticket was issued and no two tickets issued on any given day at any given site may have the same authorization number. In this matter, no two tickets from the same site within a period of 65,536 years may have the exact same certification and authorization numbers. Also, since the certification number contains the unique site identification number, no two tickets from any two sites may have the same certification number.

IV. Site Management Ring

FIG. 4a illustrates in detail the site management ring 332 which interconnects multiple ring devices 342, including site controllers 340 and 343, a local PC console, a display, and a printer. The site management ring supports a communications packet format and routing function that allows logical devices to communicate and interact over the management ring. These logical devices are embodied in the physical ring devices. For example, each physical site controller device 340 and 343 can perform the tasks associated with one or more of the following logical devices, a VLT polling device, cash ticket validation console, or a ring master device.

On each site management ring, only one site controller performs the functions of the ring master device, which maintains and monitors the integrity of the physical ring connection. Other physical devices, such as printers and displays, embody only one logical device which is the same as the physical device. That is, a printer only performs the functions of printer and a display only performs the functions of a display.

A. Management Ring Interface

Every site controller includes a site management port 384, within a site management interface 310, that includes a multi-pin connector, of which four pins are utilized to interface with the management ring. Ring devices other than site controllers are connected to external site management ring interfaces 310 to communicate along the site management ring. Each management ring interface 310 includes two primary ports and one auxiliary port 311 and 312, each of which includes a multi-pin connector. The primary ports 311 utilize four pins, while the auxiliary port 312 utilizes five pins. The primary ports 311 are interconnected via drivers 313 and receivers 314, which are identical to the drivers and receivers utilized within the site controllers, bus expanders and VLTs as explained above. Within each port, data is received on the input lines 315 and supplied via the receiver 314 to an intelligent serial port 317 which redirects the data to a corresponding ring device 342 or back onto the management ring at driver 313.

Figure 8:
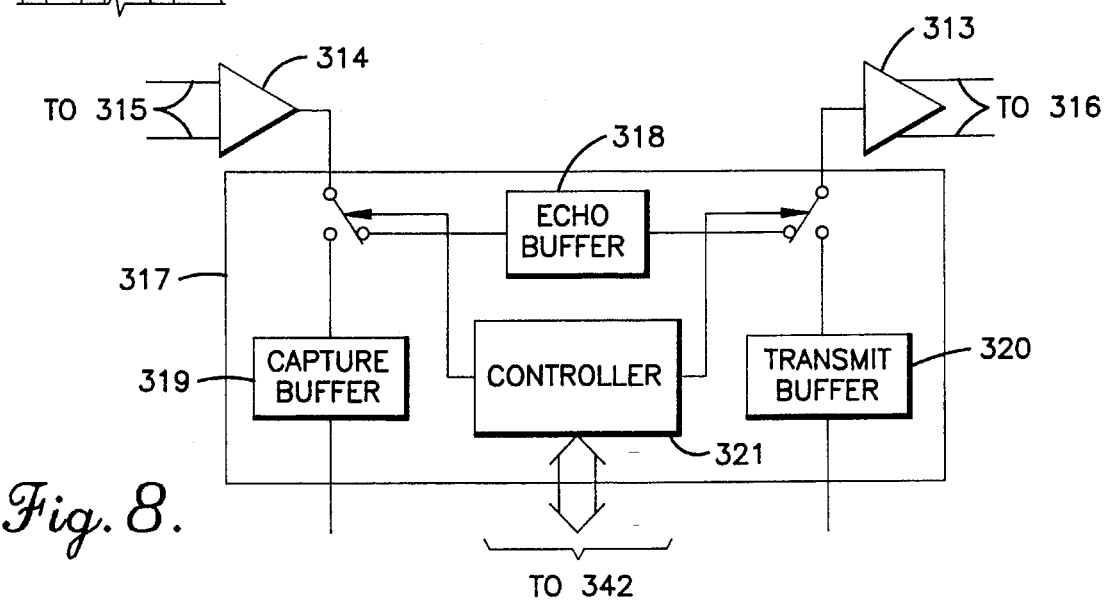
FIG. 8 illustrates a schematic of an intelligent serial port used in the present system.

Referring to FIG. 8, the intelligent serial port 317 includes three internal buffers (echo buffer 318, capture buffer 319, and transmit buffer 320) which temporarily store data. Within the intelligent serial port 317, a controller 321 determines whether and incoming packet of data is addressed to the connected ring device, and if so, the data is transferred to the capture buffer 319. If the data is not addressed to the corresponding ring device, the data is transferred to the echo buffer 318. The controller 321 then re-transmits the data on the output terminals 316. Data stored within the capture buffer 319 is subsequently transferred to the ring device 342 which processes the data in the appropriate logical device. The transmit buffer 320 provides a conduit for packets of information generated in the ring device 342 to be transferred onto the management ring. This transmit information is stored temporarily in the transmit buffer 320.

Each node on the management ring (which includes a management ring interface 310 and ring device 342) checks the destination and source of each packet transmitted along the ring and identifies packets destined for the correspondingly connected ring device 342. When a match occurs, the packet of information is directed to the capture buffer and not echoed back onto the management ring. During transmission, packets of information stored within the transmit buffer 320 are interleaved with packets of information loaded in the echo buffer 318. If no information is to be transmitted from the echo buffer 318, the packet of information in the transmit buffer 320 is immediately transmitted.

Specific communications on the site management ring allow for the integrity of the ring to be checked. These communications further allow logical devices to automatically configure themselves into the ring communications network by assigning device numbers to all logical devices on the ring. These device numbers are used to form the destination and source addresses within the communications packets on the ring. This allows the intelligent serial ports within the ring interfaces to provide for the packet identification and routing aspects required in the communications.

Figure 14:
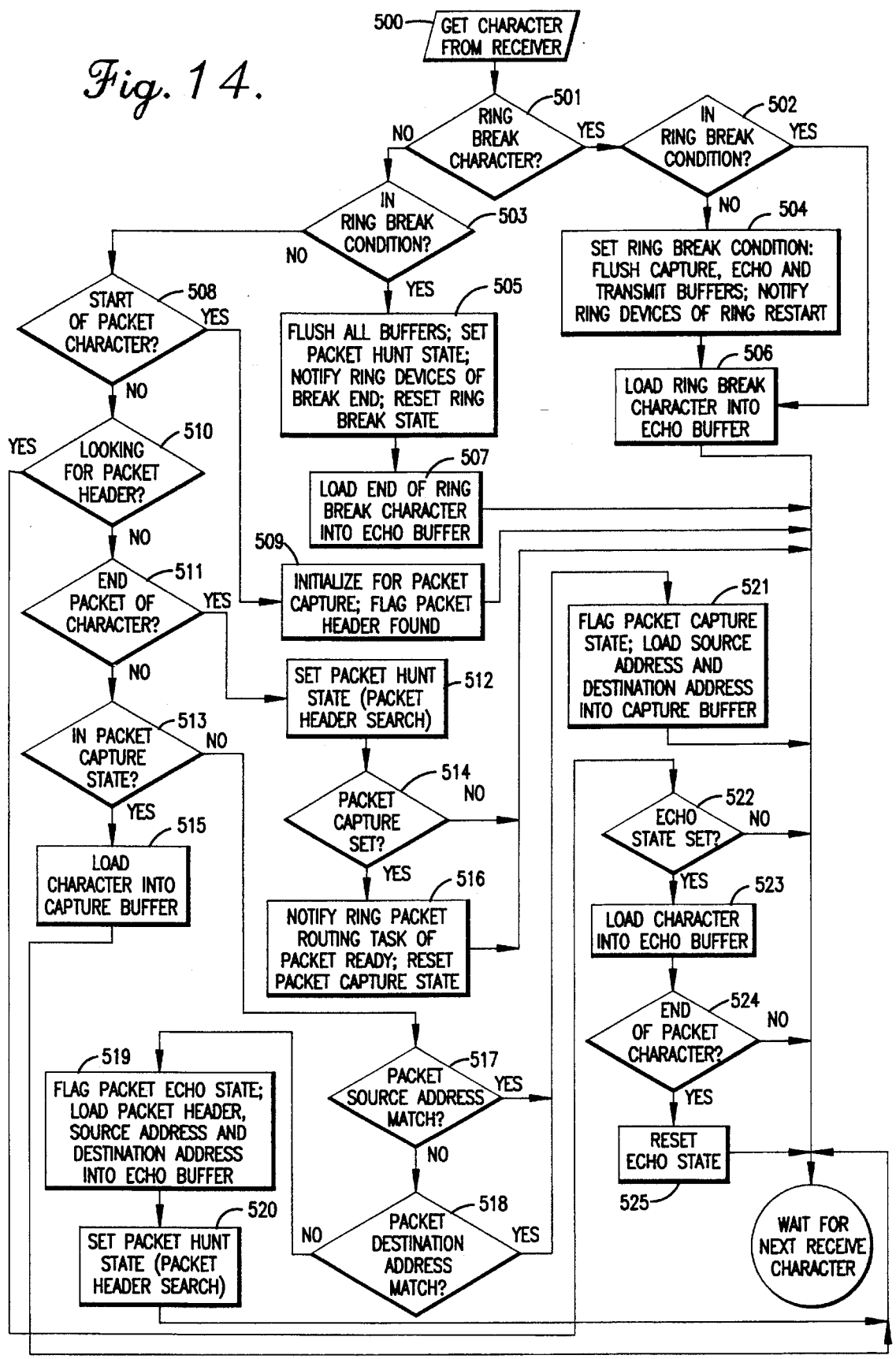
FIG. 14 is a flowchart showing the process by which a receiving section of an intelligent serial port manages data.
Figure 15:
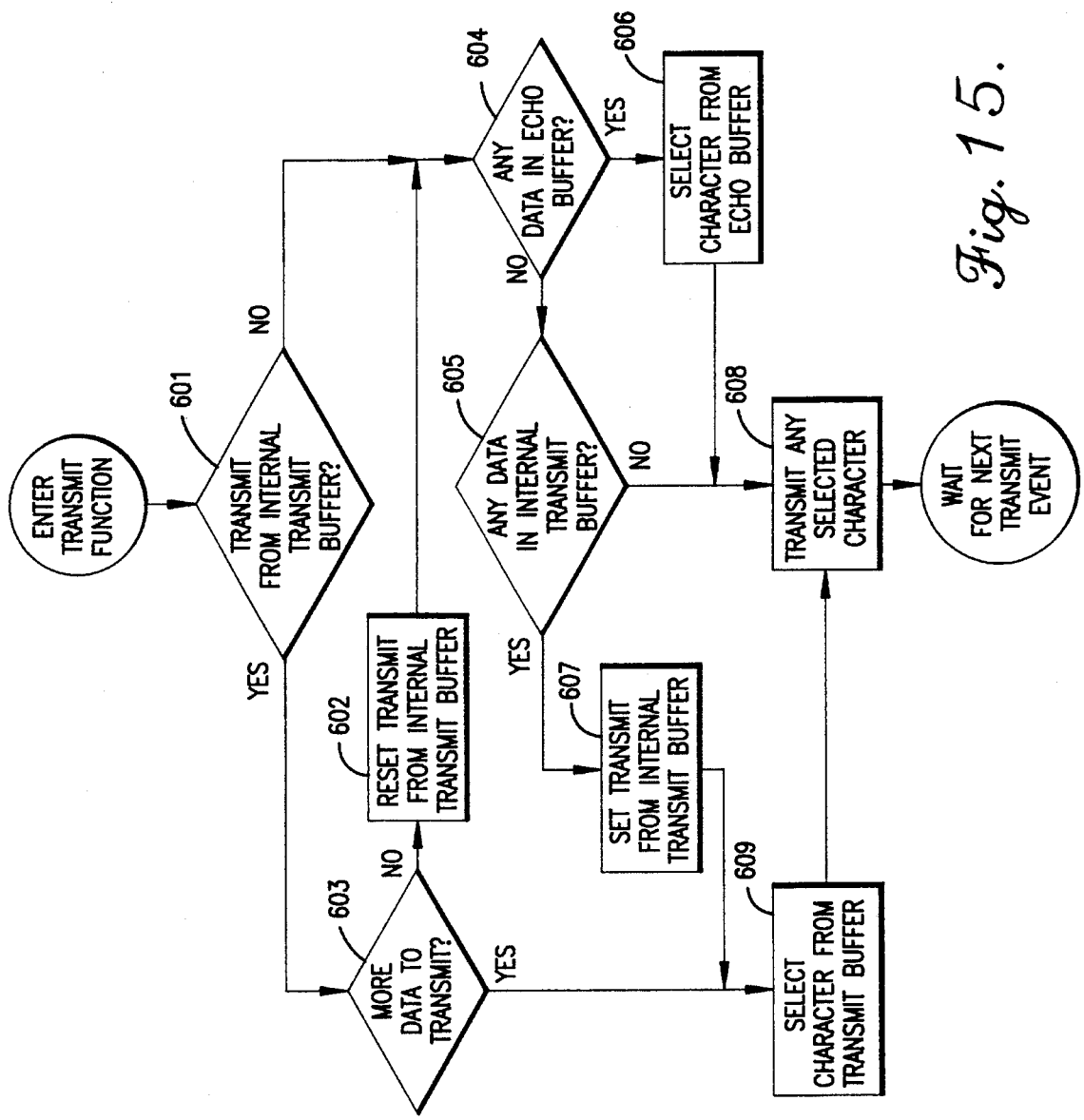
FIG. 15 is a flowchart showing the process by which a transmitting section of an intelligent serial port manages data.

FIGS. 14 and 15 illustrate the processing steps performed by the intelligent serial port 31 when receiving packets from, and transmitting packets to, the site management ring (SMR). In FIG. 14, once the receiver 314 receives a character, the controller 321 reads the character therefrom (step 500). If the character is a ring break character (step 501), the controller 321 determines whether the device is currently in a ring break condition (step 502). If not, a ring break condition is set and the capture, echo and transmit buffers 318–320 are flushed of all data (step 504). Next, the controller loads the ring break character into the echo buffer and begins transmitting it along the SMR (step 506) to the next ring device.

If the character is not a ring break character, but the device is in a ring break condition (step 503), the capture, echo and transmit buffers are again flushed and the ring break condition is reset. A packet hunt state is set, and the ring devices are notified of break end (step 505). Next, the end of the ring break character is loaded into the echo buffer (step 507) for transmission to the next device on the ring. If no ring break condition exists (step 503), the controller 321 determines whether the character is a packet start character (step 508). If so, the controller sets up to capture the packet (step 509) and the packet header flag, indicating the start of a packet, is set. If the character is not a packet start character, but the controller is looking for a packet header (step 510), it determines whether an echo state is set (step 522) If so, the character is passed to the echo buffer (step 523), otherwise the character is discarded and not transmitted on the ring. This process is used to filter noise or garbage from the ring which would otherwise circulate forever. If the character is passed to the echo buffer (step 523) and is an end of packet character (step 524) the echo state is reset (step 525).

Back at step 510, if the controller is not looking for a packet header, it determines whether the character is a packet trailer (step 511). If yes, the packet hunt state is set to search for the next packet header (step 512). Also, if the packet capture is set (step 514), the controller notifies the ring device that the capture buffer contains a packet and is ready to be read (step 516). At step 511, if the character is not a packet trailer and the capture state is set (step 513), the character is loaded into the capture buffer (step 515). If not in a capture state (step 513), the controller determines whether the packet source address matches that of a logical device associated with the intelligent serial port (step 517). If not, the controller next determines whether the packet destination address matches that of a logical device associated with the intelligent serial port (step 518).

If either the source or destination address corresponds to an attached logical device, the controller must capture the packet. Accordingly, it sets the packet capture state (step 521) and loads the source and destination addresses into the capture buffer. If neither the source nor the destination address corresponds to an attached logical device, the controller 321 sets the echo state and loads the source and destination addresses into the echo buffer (step 519). Next, it sets the hunt state (step 520) to search for the next packet header character. The intervening characters in the current packet will now be passed to the echo buffer (steps 522 and 523).

FIG. 15 illustrates the tasks performed by the controller 321 when a character is ready to be transmitted out to the SMR. First, the controller determines whether the current transmit logic is selecting characters from the transmit buffer (step 601). If not, it checks the echo buffer (step 604) for data and if true, selects the next character therefrom (step 606) and transmits it (step 608). If the echo buffer is empty, the transmit buffer is checked for data (step 605). If data is present in the transmit buffer, transmit from the transmit buffer is set (step 607), the next character in the buffer is selected (step 609) and transmitted (step 608). Back at step 601, if the controller is currently selecting characters from the transmit buffer, it determines if more data is present in the buffer (step 603). If not, the flag signifying transmit from the trasmit buffer is reset (step 602) and the echo buffer is checked for any data (step 604). If more data exists to transmit from the transmit buffer (step 603), the next character from the transmit buffer is selected (step 609) and transmitted (step 608). After trasmitting any character, the controller 321 waits for the next transmit event. Using this logic, the controller interleaves transmission of packets in the echo and transmit buffers (318 and 320 in FIG. 8).

Figure 16:
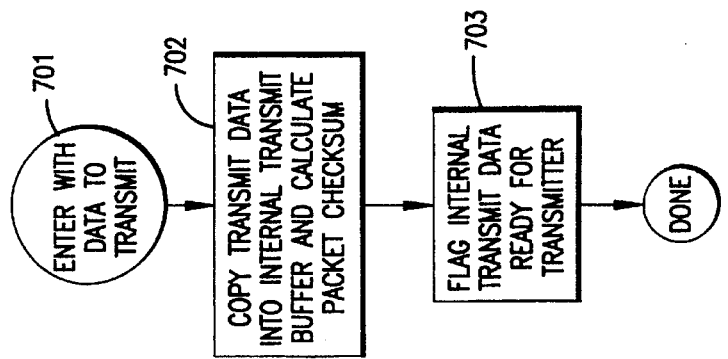
FIG. 16 is a flowchart showing the process by which a transmitting section of an intelligent serial port stores data to the transmit buffer.

FIG. 16 illustrates the manner in which a logical device transfers packet data to the internal transmit buffer (320 in Fig. 8). First the logical device prepares data to transmit and notifies the controller 321 of such (step 701). Next, the controller copies the data into the transmit buffer and calculates the packet checksum (step 702). Finally, the controller 321 sets the transmit data flag to identify that data is ready for transmission (step 703) and is done. The transmit logic of FIG. 15 described above will now take place.

B. Site Management Ring Communications Protocol

Referring to FIG. 1, each type of physical device contains several logical devices each of which performs a different function related to the management of the gaming related activities at the site. Each logical device type utilizes a unique command structure to facilitate the interaction between logical devices and accomplish the specific functions associated with that logical device type. The specific device commands are embedded within the data packets transmitted over the site management ring. All data packets utilize the same basic structure or protocol, as illustrated below, with the specific device commands embedded within the DATA FIELD. In the following illustrations, each segment includes the field name and byte size within the parenthetical.

| HDR (1) | MESSAGE HDR (4) | DATA FIELD (#) | CRC (2) | TLR (1) |

The header and trailer fields (HDR and TLR) contain unique characters which identify the beginning and end of each packet. The cyclic redundancy check (CRC) field is provided for detection of communications errors. The data field is variable in size depending upon the length of the command therein. The first byte of the data field indicates its length. The message header field, preceding the data field, maintains a uniform format in order to be readable by every logical device type. This message header identifies the routing of the data packet, i.e. which logical device or devices which are to capture and process the data packet. The message header also identifies the format of the command within the data field. The message header field is segmented as follows:

| Destination Device Type ID and Number (1) | Source Device Type ID and Number (1) | Packet Control Code (1) | Packet Format Type ID (1) |

The destination and source ID fields are each separated into two 4-bit parts (i.e., upper and lower nibbles). The upper nibble identifies a logical device type, while the lower nibble identifies a group or specific logical device within the set of device types. Table 3 below illustrates, in the two left-most columns, device type IDs which have been assigned to logical device types.

TABLE 3

| Device Type | Logical Device | Packet Format ID | Description of Command within Packet Data Field |
|---|---|---|---|
| 0 | All Device | 0 | Query for # of Devices |
|   |   | 1 | Time Set |
|   |   | 2 | Set Site Operational Parameters |
| 1 | VLT Polling | 0 | ACK/NAK |
|   |   | 1 | VLT Data Request/Response |
|   |   | 2 | VLT/Polling Device control information |
|   |   | 3 | Polling Device VLT list request |
| 2 | Cash Ticket Validation | 0 | ACK/NAK |
|   |   | 1 | Cash Ticket/Validation request/response |
| 3 | RPS Data Handler | 0 | ACK/NAK |
|   |   | 1 | Host device connection information |
|   |   | 2 | RPS data queue information |
| 5 | Printer | 0 | ACK/NAK |
| 5 | Display | 0 | ACK/NAK |
| 6 | Logical Operator | 0 | ACK/NAK |

TABLE 3-continued

| Device Type | Logical Device | Packet Format ID | Description of Command within Packet Data Field |
|---|---|---|---|
| 15 | Ring Master | 0 | Ring Integrity Check |

As illustrated in the two left-most columns of Table 3, the device type 1 corresponds to all site controllers performing the tasks of a VLT Polling device. The device type 2 corresponds to all site controllers performing the tasks of a cash ticket validation device. The device type 3 corresponds to any site controller operating as a RPS data communications handler. Similarly, the device types 4–6 correspond to a printer, a display, and a local operating console. Device types 7–14 have not yet been assigned, and device type 15 corresponds to the site controller performing the tasks of a ring master device. Device type 0 does not correspond to any single device, but instead represents a universal identifier recognized by every logical device. Data packets containing a destination device type 0, will be processed by every logical device on the site management ring.

The device number within each destination and source ID indicates all or a specific device within any device type, thereby allowing multiple logical devices having the same device type to exist on the site management ring. A device number equaling 0 directs all devices of the specific device type to capture and process the data packet. For instance, if a data packet is transmitted with a message header having a destination device type 2 and a destination device number 3, then the packet is addressed to cash ticket validation console #3. The source device type and number never equal 0.

The packet control field is a bit field used to facilitate processing of a data packet. Specifically, the four least significant bits (LSB) provide a packet sequence number which identifies the position of the corresponding data packet within a sequence of packets trasmitted between two logical devices. The fifth LSB identifies whether a data field is present within the corresponding packet, while the sixth LSB identifies whether the packet sequence number part of the packet control field is valid and to be used by the logical devices. The seventh LSB indicates that the present packet is an intermediate packet within a sequence of packets and additional packets will follow, while the eighth LSB is undefined.

The data field is variable in length and consists of two parts. The first part, the data length section, is two bytes in length and identifies the number of bytes to follow in the second part, the data section. Data fields vary in length depending upon the type of packet being transmitted which is dictated by the destination and source device types.

The present system utilizes four unique characters, $ 02, $ 03, $1B, and $14, which may appear within the byte stream of a packet. These characters uniquely identify the start of a packet, the end of a packet, an escape sequence, and a ring restart, respectively. Since these characters may be generated as data within a packet, a mechanism must exist to modify the data character such that it is not misinterpreted as one of the unique character functions. The modification method is an escape sequence performed upon the data character. This escape sequence is performed by inserting, within the data stream, the character S1B immediately prior to the data character position in the byte stream. The data character is not literally included within the byte stream, but instead the character is logically exclusive OR'd with the character $ 40. The result of this exclusive OR function is inserted into the byte stream in the place of the original character.

When a receiver of the byte stream finds the unique character $ 1B, the receiver initiates an escape sequence. Within this escape sequence, the character $1B is discarded and not treated as part of the incoming packet. The next character within the byte stream is exclusive OR'd with the character $ 40. This action recovers the original data character and the resulting character is treated as part of the data withing the packet, not as a unique character. When the cyclic redundancy check (CRC) is performed, the escape character $ 1B is always ignored and the CRC function is done on the raw (un-escaped) characters.

Again referring to the message header field, the packet format type ID identifies the type of command within the data field currently being transmitted. This packet format type ID in combination with the device type ID specifies the format of the command within the data field as selected from the set of commands associated with that device type. Referring to Table 3, the rightmost column describes each command uniquely identified by each device type ID and packet format type ID.

1. SMR—Ring Master Device Commands

One site controller on the SMR performs the tasks of a ring master device and manages the SMR by transmitting "broadcast commands" to all other logical devices connected to the SMR. These broadcast commands are identified by a device type 0. The Ring Master broadcasts the following three types of commands:

Packet Format Type 0=a universal device query, transmitted by the master device, in order to ascertain the logical device number of each logical device on the site management ring, to ascertain how many logical devices of each type are connected to the SMR and to enable each logical device to assign itself a unique logical device number;

Packet Format Type 1=a universal time setting command, transmitted to synchronize the time clock within each logical device;

Packet Format Type 2=a universal parameter setting command transmitted to set the hours of operation of every logical device.

The Universal Device Query includes a packet having a data field 10-bytes in length. Within the data field, 8-bytes are separated to form 16 nibbles, each nibble corresponding to one of the 16 logical device types listed in Table 3. More directly, the upper nibble of the first byte corresponds to device type 0, while the lower nibble of the last byte corresponds to device type 15. While being passed along the SMR, these 16 nibbles maintain an ongoing count of the total logical devices of each type.

Each logical device processes this query by reading these 8-bytes from the data field (also the "device number count") and ascertains the value of the nibble therein that corresponds to this type of logical device. The logical device records the value of the corresponding nibble in its memory as its unique logical device number. Thereafter, the logical device updates the device query packet, by incrementing the corresponding nibble in the data field, and transmits the updated packet on the site management ring. Each subsequent device repeats this process and returns the updated device query packet to the master device. In this manner, a different device number is assigned to each device and the master device identifies the number of devices having each device type. These device numbers are used for the destination and source fields in all subsequent packet transmissions.

The device query also includes a 2-byte start-up ID code representing a random number generated by the master device. The master device uses the start-up ID to identify uniquely this packet and to ensure that no other site controller is functioning in a master mode. Thus, when a master device transmits a device query packet with a start-up ID and receives an updated query packet with a different start-up ID, it is assumed that another master device is connected to the ring. Only one master device is allowed on the SMR, and thus the ring will not properly start and remain in a down state.

The Universal Time Setting command includes a data field having 9-bytes, the first 4 bytes of which represent a current universal date and time, the second 4 bytes of which represent daylight savings change date and time, and the last byte of which represents the time zone code for the site. Upon receipt, each logical device updates its internal clock based on this data field time setting information.

The Universal Parameter Setting command sets the site operational parameters. This packet includes a 56 byte data field which includes a list of the site operational hours.

2. SMR—VLT Polling Device Commands

One or more site controllers perform the tasks of a VLT polling device (hereafter the VLT PD), one of which performs the tasks of a master VLT PD (see site controller 40CM at gaming site 3C in FIG. 1) and those remaining perform the tasks of slave VLT PDs (see 40CS). The VLT PDs use VLT PD commands to enable the master VLT PD 40CM and the central site computer 10 to communicate with VLTs 30C connected to the slave VLT PDs 40CS. The VLT PD commands allow a slave VLT PD 40CS to transmit VLT packets and control information from a VLT, along the VLT communications bus 31C onto the SMR 32C and ultimately to the master VLT PD 40CM and central site computer 10. The master VLT PD 40CS maintains a control block for each VLT 30C at the gaming site 3C. The VLT PD commands are identified by a device type 1. The following four types of commands may be included within a VLT polling device packet:

Packet Format Type 0=an ACK/NAK command is transmitted from and received by the VLT polling devices and indicates whether a previously transmitted packet has been received properly by a destination VLT PD (i.e, an ACK command) or improperly (i.e., a negative acknowledge NAK command);

Packet Format Type 1=a VLT data request/response command is transmitted by the master VLT PD and is used to request gaming information, from a slave VLT PD, concerning a VLT connected thereto and is used to transmit the requested information back to the master VLT PD;

Packet Format Type 2=a VLT/Polling device control information command is used by master VLT polling device to manage the physical allocation of VLTs at the gaming site by adding, subtracting, searching for and polling VLTs (i.e., it allows the master VLT PD to request searches for a particular VLT by any of the remote polling devices and it allows remote polling devices to report on VLTs which are physically attached thereto or which have stopped responding);

Packet Format Type 3=a Polling device VLT list request command is used by the master VLT polling device to receive a current list of the video lottery terminal numbers, attached to a VLT polling device.

The ACK/NAK command (Packet format type 0) includes a 2 byte data field, one byte of which includes the original packet data type ID which is being responded to, and the second byte of which includes an acknowledge or negative acknowledge code (ACK\NAK). The ACK\NAK code identifies five situations (see Table 4) which may arise during the transfer of a packet to a VLT polling device.

TABLE 4

| ACK/NAK Code | Definition of Code |
|---|---|
| 0 | Acknowledgement that packet has been received properly and is valid |
| 1 | Packet has been received, but is not valid for addressed logical device type |
| 2 | Packet processing fault: RAM full on destination logical device: Packet rejected |
| 3 | VLT being requested on found by Polling device |
| 4 | VLT Communications Bus full |

As illustrated above, the ACK/NAK code 0 acknowledges that a valid packet has been received. The ACK/NAK code 1 indicates that a packet has been received, but is not valid for the receiving device type. The ACK/NAK code 2 indicates that a packet processing fault has occurred and the packet has been rejected, such as the destination device's RAM being full. The ACK/NAK code 3 indicates that the VLT which has been requested in a previously sent packet has not been found, while the ACK/NAK code 4 indicates that the VLT communications bus used for polling between the VLT polling device and the corresponding VLT is full.

The VLT Data Request/Response command (format type 1) contains the data required to meet the communications protocol specifications for the VLTs, of which multiple versions may exist. The VLT data request/response packet includes a 1-byte type code, an unused byte, a 2-byte order number, a 2-byte VLT terminal number, a 2-byte VLT command number, and a data string having a variable length. The type code identifies the packet as a response or a request and the type of information (0=host data request, 1=cash ticket transaction response, and 2=site info request). The order number uniquely identifies the request/response and the terminal number uniquely identifies the VLT to be polled for gaming information. The command word identifies the gaming information being sought, and the data string forms gaming information sent to and from the VLT.

The VLT/Polling Device Control Information (packet type 2) includes a data field having upto 22 bytes therein, including a 1-byte control type code, a 1-byte flag bit-map, a 2-byte VLT terminal number, a 4-byte VLT permit number, a 4-byte VLT manufacturer's information field, a 2-byte VLT ROM check result and an 8-byte VLT validation key. The VLT validation key, as explained above, is used a by a site controller and a VLT as an encryption/decryption key to encrypt and decrypt the appropriate segments of packets transmitted between them. The terminal number, permit number, and manufacturer's information identifies the VLT or VLTs affected by the control information. Table 5 illustrates the control type codes and their descriptions.

TABLE 5

| Control Type Code | Description of Code Type |
|---|---|
| 0 | VLT search request |
| 1 | VLT delete request |
| 2 | VLT remove request |
| 3 | VLT or Polling device auery |
| 4 | VLT or Polling device status |
| 5 | VLT information undate |

The control type code 0 allows a master VLT PD to direct slave VLT PDs to search for a particular VLT, while the type code 1 directs slave VLT PDs to delete a VLT from an active VLT list. The control type code 2 directs slave VLT PDs to remove a VLT from the active poll list. The control type code 3 queries slave VLT PDs for control information concerning a particular VLT. The control type code 4 allows slave VLT PDs to report their status or that of a specific VLT. The control type code 5 allows the master VLT PD to transfer VLT control information such as validation keys, rom check results, and permit numbers to a slave VLT PD.

The 1-byte flag includes eight 1-bit values, two of which are undefined. The remaining six bits correspond to different VLT statuses, namely whether or not a VLT is attached to the Polling device, a VLT is responding to a poll command, a VLT is in a temporary add state, a VLT is in an active poll state, a VLT polling bus is full, and whether or not the flags byte is valid.

The VLT/Polling device control information command is not always transmitted with all 22 bytes of information since the control types 1, 2, and 3 typically do not include the permit number, manufacturer's information, ROM check results and validation key. In fact, polling device queries (control type 3) will have a length of two bytes and VLT queries (control type 3) will have a length of four bytes. Thus, the receiving device checks the length of the data field when processing each packet.

The Polling Device VLT List Request (packet type "3") includes a data field having a variable number of bytes therein. This command requests a list, in the data field, of all VLT terminal numbers attached to the designated VLT polling device. If no VLTs are attached to this polling device, then the data field length equals 0.

3. SMR—Cash Ticket Validation Console Commands

One or more site controllers perform the tasks of a Cash Ticket Validation Console (hereafter the CTVC), one of which performs the tasks of a master CTVC (see site controller 40BM at gaming site 3B in FIG. 1) and those remaining perform the tasks of slave CTVCs (see 40BS). The CTVCs have a logical device type of 2 and use CTVC commands to enable the slave CTVCs 40BS to communicate with the master CTVC 40BM (if used). The CTVC commands allow a slave CTVC 40BS to transmit and receive cash ticket records to and from the master CTVC 40BM and ultimately to the central site computer 10. The master CTVC 40BM represents the only site controller at the gaming site 3B that is connected to VLTs 30B and that issues cash tickets. Thus, only the master CTVC 40BM contains the cash ticket logs for every cash payout generated by a VLT. The following two types of commands may be included within a cash ticket validation console packet:

Packet Format Type 0=an ACK/NAK command (acknowledgement or negative acknowledgement) transmitted to and received by the CTVCs, indicates whether previously transmitted packets have been received properly or improperly by a destination CTVC;

Packet Format Type 1=a Ticket Validation Request/Response command is transmitted between CTVCs in order for a slave CTVC to request, from the master, cash ticket validation information concerning a ticket that the slave CTVC is attempting to validate.

The ACK/NAK command substantially resembles the ACK/NAK command, in format and purpose, as used by the VLT Polling device, as explained above.

The Ticket Validation Request/Response command (packet format type 1) includes a 1-byte request control bit field, a 1-byte VLT transaction number, a 4-byte site ID, a 2-byte ticket sequence number, a 2-byte ticket security code, a 4-byte cash ticket amount, a 2-byte ticket issue date, a 2-byte ticket issue time, a 4-byte VLT permit number, a 2-byte validation date, a 2-byte validation time, a 2-byte validation clerk ID number, and a 2-byte validation sequence number.

The request control bit field includes three undefined bits and five defined bits. Of the five defined bits, one indicates whether the master CTVC 40BM has found the ticket, one indicates whether the ticket should be validated, one indicates whether the master CTVC 40BM has previously validated the ticket, and one indicates whether the master CTVC 40BM requires the certification number. The fifth defined bit identifies the command as a Ticket Validation Request from a slave CTVC 40BS or a Ticket Validation Response from a master CTVC 40BM.

Concerning the remaining bytes within the validation request/response, these bytes include the same information as transmitted between a VLT PD and a VLT when issuing a cash ticket (as explained above in connection with the cash ticket generation scheme). In other words, these remaining bytes include the information stored in a record in the cash ticket log, namely a VLT transaction number, site ID, ticket sequence number, ticket security code, cash ticket amount, ticket issue date, ticket issue time, VLT permit number, validation date, validation time, validation clerk ID number, and validation sequence number. The slave CTVC 40BS uses these remaining bytes to validate a cash ticket (as explained below in connection with the cash validation scheme).

4. SMR—Regional Polling Site Communications Handler Commands

One site controller performs the tasks of a Regional Polling Site Communications Handler (hereafter the RPS CH) (see site controller 40CM at gaming site 3C in FIG. 1). The RPS CH uses RPS CH commands to manage communications between the RPS banks 11 at the central site computer 10 and the site controllers. For example, whenever a cash ticket is created or redeemed at a gaming site 3C, the corresponding cash ticket record is uploaded to the central site computer 10 and is added to a central site cash ticket log. The RPS CH uses the RPS CH commands to ensure that the cash ticket record is successfully transmitted to the central site computer 10. The RPS CH commands have a device type 3. The following three types of commands may be included within a RPS CH packet:

Packet Format Type 0=an ACK/NAK command (acknowledgement or negative acknowledgement), transmitted to and received by the RPS CH, indicates proper and improper receipt of a previously transmitted packet;

Packet Format Type 1=a host device connection information command is used to notify the RPS CH of the device address of the physical host link (i.e., the device number of the site controller that includes the modem connected to the central site computer;

Packet Format Type 2=a RPS data queue information command is used to pass RPS communications packets to the central site computer through the site controller with the modem physically connected to the phone link.

The ACK/NAK command substantially resembles the acknowledge packet utilized by the VLT PD and the CTVC (Table 4).

The Host Device Connection Information command (format type 1) includes 2-bytes, one of which identifies the number of the logical device (i.e., site controller) that is connected to the central site computer via a ;modem connection with the primary central site. The second byte of data in the host device connection packet identifies the state of the host communications link (i.e., the telephone connection), namely whether the RPS communications link is up or down and whether the host communication link is up or down.

The RPS Data Queue command (format type 2) includes a data field having 1 undefined byte, a 1-byte RPS data queue, a 1-byte RPS data type code, a 1- byte block count, and an undefined number of data bytes. The block count identifies the amount of data connected thereto.

5. SMR—PC Console, Printer and Display Commands

Additional logical devices that are connected to the SMR include local PC consoles, printers and displays. Each of these logical devices transmit commands formatted to the specific type of PC console, printer or display. The PC consoles, printers and displays transmit an ACK/NAK command along the site management ring. This ACK/NAK command substantially resembles the structure of the ACK/NAK command explained above, but only utilizes format types 0 and 1 (see Table 4).

C. Cash Ticket Validation Scheme

As explained above, all site controllers 40 (see FIG. 1) perform the tasks of a cash ticket validation console (CTVC). Hereafter, two embodiments for the site controller are set forth to validate a cash ticket. Both embodiments use similar checks and comparisons to validate the ticket, but use a different technic to request validation information from other CTVCs depending upon the configuration of VLTs at the gaming site.

1. First Embodiment of Cash Ticket Validation Consoles (CTVCs).

Within FIG. 1, gaming site 3B illustrates one site controller 40BM connected to all of the VLTs. This SC 40BM performs all of the tasks associated with a VLT PD and maintains a cash ticket log for every cash ticket generated in response to a request by a VLT. Accordingly, the site controller 40BM is deemed the master CTVC. When the SMR 32B is "started up" and the site controller performing the tasks of the ring master device transmits the Universal Device Query, the CTVC 40BM obtains the device number 1 as a master CTVC and the remaining CTVC 40BS obtains the device number 2 as a slave CTVC. Subsequently, the slave CTVC 40BS records the device number of the master CTVC 40BM and uses this device number to address the master CTVC 40BM when requesting cash ticket validations.

Referring to FIG. 1 and gaming site 3B, to redeem a cash ticket, a player presents the ticket to a clerk at either CTVC 40BM or 40BS. If the player presents the ticket to the clerk at the master CTVC 40BM, the CTVC attempts to validate the ticket according to the flowchart of FIG. 11. First, the clerk enters the 10-digit authorization number (210 FIG. 7) from the cash ticket (step 110). The CTVC separates the number into its respective parts by converting the first 5-digits into a 16-bit binary ticket sequence number (step 111) and by converting the second 5-digits into a 6-bit binary ticket security code (step 112). Next, the CTVC searches the cash ticket log for any records containing this cash ticket sequence number and security code (step 113).

If the CTVC finds more than one record that matches the authorization information on the cash ticket (step 114), the CTVC prompts the clerk for the certification number (209 FIG. 7) on the cash ticket (step 115), otherwise the CTVC proceeds to step 117. Once the certification number is entered by the clerk, the CTVC separates the certification number into its respective parts, the gaming site ID number and the ticket issue date. The CTVC selects the correct cash ticket record from the set matching the authorization information using the ticket issue date information (step 116). If no matching record is found (step 117), the CTVC 40BM notifies the clerk (step 118). If a match is found (step 117), the CTVC determines whether the ticket has already been redeemed (step 119). If the ticket has been redeemed, the CTVC notifies the clerk (step 120) and prevents the ticket from being redeemed more than once. If the ticket has not been redeemed, the CTVC displays the cash ticket record information to the clerk and prompts the clerk to confirm that the ticket is to be redeemed (step 121). This clerk verifies that the cash ticket record information displayed by the CTVC exactly matches the information printed on the cash ticket. If a perfect match exists, and the clerk elects to redeem the ticket, the clerk confirms to the CTVC that the ticket has been redeemed (step 122). The CTVC marks the ticket as redeemed in the cash ticket record (step 123). In this manner the clerk has a quick and positive means to verify the validity of the cash ticket before redemption.

Figure 12:
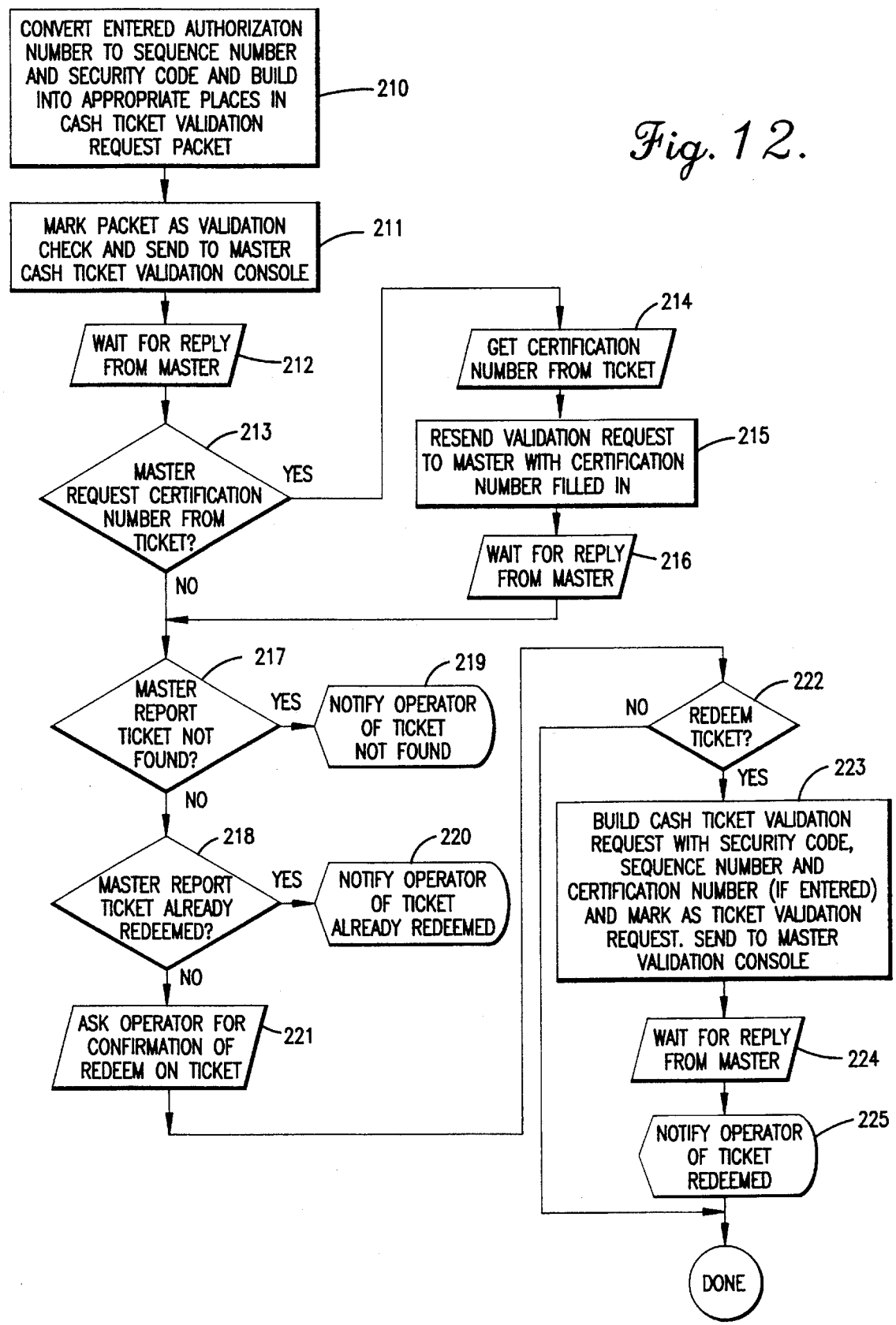
FIG. 12 is a flowchart showing the process by which a slave cash ticket validation console validates a cash ticket according to a first embodiment.

Alternatively, if the player presents the cash ticket to the clerk at the slave CTVC 40BS, then the slave CTVC performs the steps illustrated in FIG. 12 to validate the ticket. More directly, the slave CTVC 40BS converts the first 5-digits of the authorization number entered by the clerk into a 16-bit binary ticket sequence number and the last 5-digits into a 16-bit binary ticket security code (step 210). Next, the slave CTVC 40BS generates a Cash Ticket Validation Request to be transmitted to the master CTVC 40BM. The slave CTVC 40BS includes, in the request, a message header having a destination logical device type of CTVC and address (#1) corresponding to the master CTVC 40BM and a source logical device type of CTVC and address (#2) corresponding to the slave CTVC 40BS. The slave CTVC 40BS sets the packet format type ID to identify the packet as a Cash Ticket Validation Request (format type 1). The slave CTVC 40BS marks the validation request as a validation check (step 211) and transmits the request.

Within the validation request, the data field includes a 2-byte length field indicating that 30 bytes of data follow. The data field includes the multi-byte segments, as explained above for a gash Ticket Validation Request. The slave CTVC 40BS includes, within the data field, the authorization information, namely the cash ticket number and the random security code. The remaining segments of the data field are set to 0.

The intelligent serial port within the master CTVC 40BM receives the request. The intelligent serial port 317 checks the device type ID and device number in the packet to determine whether the packet is addressed to the logical device associated with the intelligent serial port 317, namely the master CTVC 40BM. If not, the controller 321 directs the echo buffer 318 to re-transmit the packet along the site management ring 333. However, if the intelligent serial port 317 corresponds to the destination logical device, then the packet is loaded into the capture buffer 320.

After sending the request, the slave CTVC 40BS waits for a reply from the master CTVC (step 212). The master CTVC 40BM reads the packet from the capture buffer 319, identifies the packet as a validation request and reads therefrom the cash ticket number and security code. Next, it searches the cash ticket log for a matching record. If a single matching record is found, the master CTVC 40BM generates a Cash Ticket Validation Response packet identifying the slave CTVC 40BS as the destination device type and number. The validation response echoes the cash ticket number and security code sent from the slave CTVC, and also includes the VLT transaction number, the site/venue ID number, the cash ticket amount, the ticket issue date and time, and the VLT permit number. Finally, if the ticket has already been redeemed, the master CTVC 40BM sets the "ticket already validated" bit in the request control bit field and transmits the response packet which returns to requesting CTVC 40BS.

If the master CTVC 40BM finds multiple matching cash ticket records, the master CTVC 40BM transmits a cash ticket validation response requesting the certification number to the slave CTVC 40BS. More directly, the master CTVC 40BM transmits a response packet echoing the cash ticket number and security code and indicating that the certification number from the cash ticket is required to identify the proper cash ticket record. When the slave CTVC 40BS receives this response, it determines if the response is a request for the certification number (step 213). If so, the slave CTVC 40BS prompts the clerk for the certification number (step 214), and once entered, this number is separated into the site ID and the ticket issue date. Next, the slave CTVC 40BS retransmits the cash ticket validation request with the cash ticket number, security code, site ID and ticket issue date (step 215) and again waits (step 216).

The master CTVC 40BM receives the request and processes it in the same exact manner as before. Now however, when the multiple matching cash ticket records are found the certification information is already present in the request. The master CTVC now compares this certification information (i.e., site ID and ticket issue date) with those in the cash ticket records having matching authorization information (i.e., cash ticket numbers and security codes). If one of the cash ticket records contains matching certification and authorization information, the master CTVC 40BM transmits a response packet as before with the additional ticket information noted above filled in and noting whether or not the ticket has been validated. If the master CTVC 40BM does not find a matching cash ticket record, it transmits a Cash Ticket Validation Response to the slave CTVC 40BS indicating a "ticket not found" status for the entered cash ticket authorization and/or certification information.

When the slave CTVC 40BS receives the response, it determines whether a ticket was found (step 217) and if so, if it is already redeemed (step 218) and notifies the clerk accordingly (steps 219–220). If a ticket was found but not yet redeemed, the cash ticket information from the response is displayed and the clerk is prompted to confirm the redemption (step 221) as before. If the clerk confirms the ticket is to be redeemed (step 222), the slave CTVC 40BS builds and transmits another Cash Ticket Validation Request with the security code, sequence number and certification number (if entered), marks the request as a ticket validation request, and sends the request to the master CTVC 40BM (step 223). The master CTVC 40BM receives the request, processes the ticket information, and updates the appropriate matching record in its cash ticket log by storing the redemption information therein. The master CTVC 40BM now returns a cash ticket redeemed confirmation to the slave CTVC. When the slave CTVC 40BS receives this confirmation from the master CTVC 40BM (step 224), the slave CTVC notifies the clerk that the ticket was redeemed (step 225).

The system will disallow any further attempts to again validate this cash ticket, This process ensures that duplicates or copies of the orginal cash ticket cannot be later validated anywhere in the system. Also, the complexity of the information on the cash ticket which must match with the site controller cash ticket record makes for a virtual impossibility of a randomly printed false ticket passing the validation process.

Subsequently, the validated cash ticket record is uploaded to the central site computer and is maintained on the system for an indefinite period of time, providing for a permanent record of the transaction. The information can also be used to maintain the financial account of a gaming site and provide a means to identify cash tickets which are valid but not yet redeemed. Having the cash ticket record at the central site also provides a means of validating the cash ticket at a gaming site other than where it was generated and still allow only a one time validation.

2. Second Embodiment of CTVCs in the above embodiment, one site controller at a gaming site (3B in FIG. 1) performed the tasks of a master CTVC and created all the cash ticket records and responses directed to the VLTs to issue cash tickets. Accordingly, this site controller was the only one that contained a cash ticket log. This method is used to ensure that all tickets issued at a site have no missing sequence numbers in the authorization numbers created for a given day. However, this condition may not need to be imposed on the operation of the site controllers within a site.

Within FIG. 1, gaming site 3C illustrates another site controller arrangement, in which multiple site controllers 40CM, 40CS1 and 40CS2 are connected to groups 35C of VLTs. In this alternative embodiment, each site controller issues tickets for the group of VLTs connected thereto. Therefore, each site controller performs the tasks of a VLT PD and maintains a cash ticket log for its corresponding VLTs. Thus, when a site controller performs the tasks of a CTVC to validate a cash ticket, that site controller checks its internal cash ticket log first and if no match to the cash ticket is found, then it must check the cash ticket logs of the other site controllers.

Figure 11:
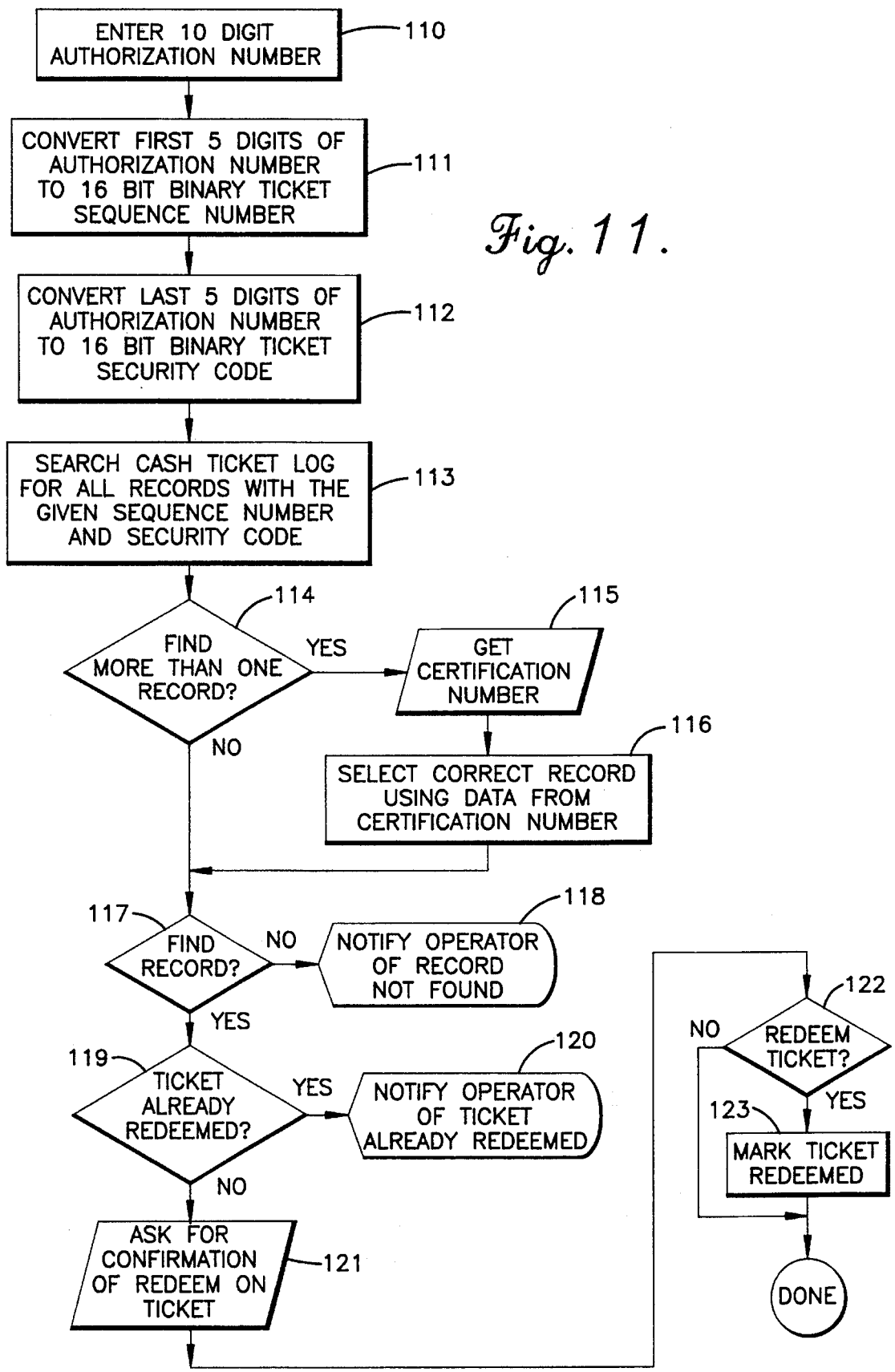
FIG. 11 is a flowchart showing the process by which a master cash ticket validation console validates a cash ticket according to a first embodiment.

Accordingly, when a player presents a cash ticket to any CTVC, for instance CTVC 40CS2 (FIG. 1), it first performs the steps of FIG. 11 and attempts to find a matching cash ticket within its internal cash ticket log. If no internal cash ticket records within the CTVC 40CS2 (hereafter the originating CTVC) match the authorization information from the presented cash ticket, the originating CTVC 40CS2 expands its search. Specifically, it builds a Cash Ticket Validation Request (as in step 210 of FIG. 12) and transmits this request to all CTVCs on the SMR. This request moves along the SMR to each CTVC in physical order, for this instance CTVC 40CM is first external CTVC to receive the request. The second CTVC 40CM checks its cash ticket log according to the process of FIG. 11 (steps 110–123). If the second CTVC 40CM finds a matching record or records, it processes the request in the same manner as the master CTVC 40BM did in the first embodiment by returning the cash ticket information to the requesting CTVC and updating the cash ticket record in the cash ticker log if needed. If the second CTVC 40CM finds no matching records, it "echoes" the request from the first CTVC 40CS2 to the next CTVC on the SMR in this instance CTVC 40CS1. If no CTVCs find a cash ticket record matching the request, the originating CTVC will get the original request back, and if it does, it would notify the clerk that the cash ticket was not found.

D. Ring Master Device Tasks

Each site controller is capable of performing the tasks of a ring master device in order to oversee the site management ring. The ring master device (RM) is responsible for start-up and control of the ring and for monitoring the integrity of the ring. The RM in the first embodiment contains a cash ticket log that stores the cash ticket logs from each CTVC. The RM also maintains all permanent VLT control blocks for the site. The RM will effect a ring restart after being reset or perceiving a ring integrity failure. The RM is reset by the system monitor therein when the 5 V supply from the power source exceeds it tolerances or when the watchdog timer in the system monitor times out. The RM identifies ring integrity failures while transmitting a ring integrity check packet along the site management ring. A failure occurs when the integrity check packet is not returned properly to the master device.

To initiate a ring restart, the RM transmits a series of ring break characters ($ 14). A ring break condition is perceived by each logical device on the SMR when 3 or more ring break characters are received in succession. At this time every logical device terminates any transmissions from the echo or transmit buffers, clears the echo buffer, resets packet identification checking, and begins echoing the ring break characters (as illustrated in FIG. 14). At this point the site management ring is considered down. Every logical device connected thereto must restart all packet transfers and control information, and prepare to resend these packets. All packets in transit or awaiting a response become invalidated by the ring break.

After every logical device echoes the ring break character for a predetermined ring break period, the RM ceases transmission of the ring break character and begins transmitting a non-break character. Every logical device echoes this non-break character. When the RM receives the echoed non-break character from the last logical device, the RM attempts a ring start by transmitting a Device Query Broadcast packet. This query broadcast packet is used by every logical device on the ring, as explained above in connection with the packet formats, to determine its new device number. Previously assigned device numbers are no longer valid and the new numbers are used thereafter. In this manner, logical devices may be added and deleted from the ring without the need to re-assign device numbers at each physical device.

Any logical devices which must know other logical devices by number perform a logical device query after the ring is restarted. The format of this logical device query will depend upon the logical device type.

The non-RM logical devices assume the ring is active and ready for normal packet transfers following the receipt of the Device query packet. When the RM receives the updated Device query packet, and no other device query packets have been received, the RM assumes that no other logical devices on the ring are attempting to function as a RM. Thus, the RM assumes a start-up state, in which it periodically broadcasts site control information, such as the date and time. The RM also periodically transmits a ring integrity check packet to ensure that the physical ring is intact.

If, during the restart operation, the RM receives a Device query packet that it did not originally transmit, it will time out and reenter a ring restart state and again attempt to restart the ring. This improper packet is identified when the start-up ID code in the received device query packet does not match the ID code in the device query packet sent by the RM. This condition exists when more than one RM is present on the ring and will result in a downed ring. The ring restart state will also be re-entered if the ring integrity check by the RM fails at any time.

E. Modem Master Tasks

The site controller also performs the tasks of a modem master (FIG. 9). The modem master 400 controls the modem 483 and ensures that all incoming calls are properly answered. The modem master 400 also ensures that the phone is placed "on the hook" when a telephone carrier line is lost or when the call is terminated by the initiating end.

In summary, the objects of the present invention are achieved by providing a video lottery system for playing electronic games on multiple video lottery terminals. The system includes a central computer at a central site and at least one gaming site remotely located from the central computer. The gaming site includes a plurality of video lottery terminals which play games and generate cash tickets representing an amount won during game play. The terminals are organized into groups, each of which is managed by a site controller connected thereto. The site controllers communicate with one another via a site management ring. A unique communications protocol used on the management ring allows multiple types of logical devices (also called ring devices) to communicate with one another along the ring. Each site controller authorizes terminals within a corresponding group of terminals to generate cash tickets and is capable of validating every cash ticket generated within the video lottery system. The site controllers emulate several logical devices including a cash ticket validation console, a terminal polling device and a ring master device. The site controllers and terminals communicate via encrypted messages for security purposes. This encryption system uses multiple encryption and decryption keys at each terminal and site controller. The site controllers perform triple redundancy information storage to ensure the integrity of the ticketing information therein.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings 1–16 is to be interpreted as illustrative, and not in a limiting sense.

What is claimed is:

1. A site controller for managing and controlling terminals playing electronic games at a gaming site, said terminals generating a cash ticket, representing an amount won during said games, said site controller comprising:

a CPU for controlling the terminals while playing games, terminal input means for receiving communications packets from said terminals, said packets including a cash ticket request from a first terminal seeking authorization to generate a cash ticket, authorization means for generating an authorization code directing said first terminal to generate a cash ticket, and terminal output means for transmitting a communications packet to said first terminal containing said authorization code, said packet including a cash ticket response to said first terminal, said first terminal generating a cash ticket responsive to said authorization code.

2. A site controller according to claim 1, further comprising a security plate, fixedly mounted at a gaming site and including at least one guide hole therein which slidably receives a corresponding number of mounting heads, said mounting heads being mounted upon a backside of said site controller, said security plate further including a slot along one end thereof which lockingly receives a lock member mounted upon said site controller, said locking member and said mounting head fixedly mounting said site controller at said gaming site.

3. A site controller, according to claim 1, wherein said communications packets include one of a plurality of data formats, said authorization code including a random number.

4. A site controller, according to claim 1, wherein said communications packets contains a validation segment for storing said authorization code transmitted from the site controller to a terminal, said validation segment including a date/time stamp, a validation seed generated by the site controller and a validation code generated by the site controller based upon said validation seed, said validation code and seed being used to validate said packets.

5. A site controller, according to claim 1, wherein said site controller includes means for continuously polling said terminals to solicit a data response to said poll from each terminal.

6. A site controller, according to claim 1, further comprising means for generating and transmitting a data read request command to request a specific type of data from a uniquely identified terminal, and means for receiving a data read reply from said requested terminal during a subsequent data transmission cycle.

7. A site controller, according to claim 1, further comprising:

means for generating a site information request command which is sent to a desired terminal to request a specific data type from said terminal; and means for receiving a site information reply packet from said terminal containing desired data about said terminal.

8. A site controller, according to claim 6, further comprising means for transmitting a packet indicating that a transaction is currently being processed by the site controller.

9. A site controller, according to claim 6, wherein said transaction request and transaction reply packets contain a transaction number assigned by said terminal to confirm a transaction reply packet received from said site controller.

10. A site controller, according to claim 1, further comprising:

means for producing data and validation segments which are included within predefined communications packets, and means for encrypting said data and validation segments prior to transmission to a terminal.

11. A site controller, according to claim 1, further comprising:

means for encrypting and decrypting said communications packets based upon encryption keys, and means for transmitting new encryption keys to said terminals to update encryption and decryption schemes to be used by said terminals.

12. A site controller, according to claim 1, wherein said communications packets include multiple segments, and wherein said site controller includes means for encrypting and decrypting each of said segments based upon a unique key associated with said segment.

13. A site controller, according to claim 1, wherein said communications packets include encrypted data and validation segments, said encrypted data and validation segments being encrypted and decrypted based upon a data segment key and a validation segment key, respectively.

14. A site controller, according to claim 1, further comprising:

means for encrypting and decrypting said communications packets based upon encryption keys, and means for switching encryption keys to be used.

15. A gaming system for playing electronic games on multiple gaming terminals, said system comprising:

a plurality of video gaming terminals for playing electronic games, said terminals being separated into at least two groups, each group including at least one terminal;

at least one site controller for controlling and managing said terminals, at least two communications buses for connecting said terminals within one group to one another, and at least one bus expander connecting said communications buses to one another and to said at least one site controller.

16. A gaming system according to claim 15, further comprising, wherein said communications bus includes transmit and receive data transmission lines, said site controller driving said receive lines, said terminals driving continuously monitoring said receive lines and maintaining said transmit lines in a tri-state except when transmitting data along said transmit lines to said site controller to allow other terminals to communicate with said site controller.

17. A gaming system according to claim 15, wherein said bus expander includes optical and power isolation components to provide optical and power isolation between said communications buses and said site controller to limit an antennae effect created by any single communications bus.

18. A gaming system according to claim 15, wherein said bus expander further comprises drivers and receivers to transmit data upon, and to receive data from, transmit and receive data lines, respectively, in said communications buses.

19. A gaming system according to claim 15, wherein said communications bus transmits a request to send signal from one of a terminal and a site controller requesting to transmit data, and wherein bus expander further comprises at least two primary ports and at least one auxiliary port for interconnecting said communications buses and said site controller, said primary and secondary ports including corresponding pairs of drivers and receivers to transmit and accept data, each driver transmitting data accepted by a corresponding receiver when a corresponding request to send signal is received by said bus expander.

20. A video gaming system according to claim 15, wherein said communications buses and said site controller include transmit and receive lines to pass data therebetween and a request to send data line to control a direction of communication through said bus expander.

21. A video gaming terminal for playing electronic games at a gaming site, said terminal communicating with a remote system through a communications link by transmitting and receiving communications packets to and from said remote system, said terminal comprising:

a CPU for controlling a play of a game;

means for transmitting and receiving communications packets along said communications link, said packets containing a packet validation segment; and means for determining a validity of said packet based upon a content of said packet validation segment, said CPU controlling said play of said game based upon a received packet when said received packet is determined to be valid.

22. A video gaming terminal according to claim 21, further comprising means for calculating a predicted validation code from a packet validation seed within said validation segment;

said determining means comparing said predicted validation code with a packet validation code within said validation segment to determine whether said received packet is valid.

23. A video gaming terminal according to claim 21, wherein said validation segment contains a validation code and validation seed and, wherein said determining means determines whether said packet validation code corresponds to said packet validation seed based upon a predefined calculation sequence followed by said remote system to generate said packet validation code and seed included within the received packet.

24. A video gaming terminal according to claim 21, wherein a received communications packet is encrypted based upon at least one encryption key, and wherein said terminal further comprises:

means for decrypting an encrypted communications packet prior to determining a validity thereof.

25. A video gaming terminal according to claim 24, further comprising:

means for storing multiple encryption keys, said decryption means attempting to decrypt the received packet with each stored encryption key prior to determining that a received packet is invalid.

26. video A gaming terminal according to claim 21, wherein said received packet is encrypted based upon one of a plurality of encryption keys and wherein said terminal further comprises:

means for attempting to decrypt the received packet based upon each encryption key before determining that said received packet is invalid.

27. A video gaming terminal according to claim 25, wherein said decryption means switches from current to next encryption keys when attempting to decrypt said packet after said determining means determines that said packet is invalid when encrypted with said current encryption keys.

* * * * *